Figure 1:
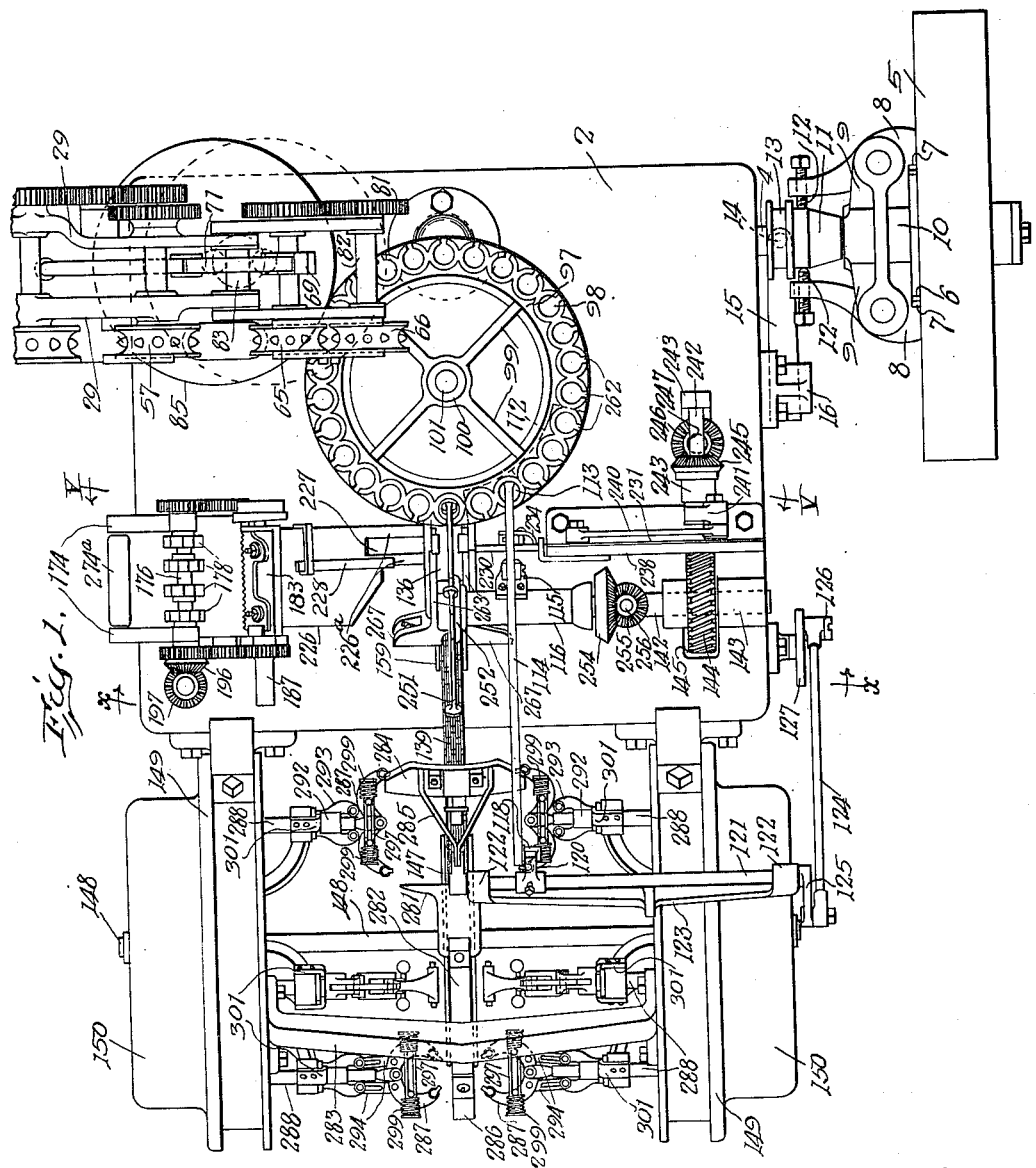

D. T. & D. C. IGOU.
WRAPPING MACHINE.
APPLICATION FILED SEPT. 19, 1910.

1,147,402.

Patented July 20, 1915.
15 SHEETS—SHEET 1.

Witnesses
G. Howard Walmsley.
Edward S. Reed.

Inventors
Dennis T. Igou,
Dale C. Igou,
By H. A. Coulter,
Attorney

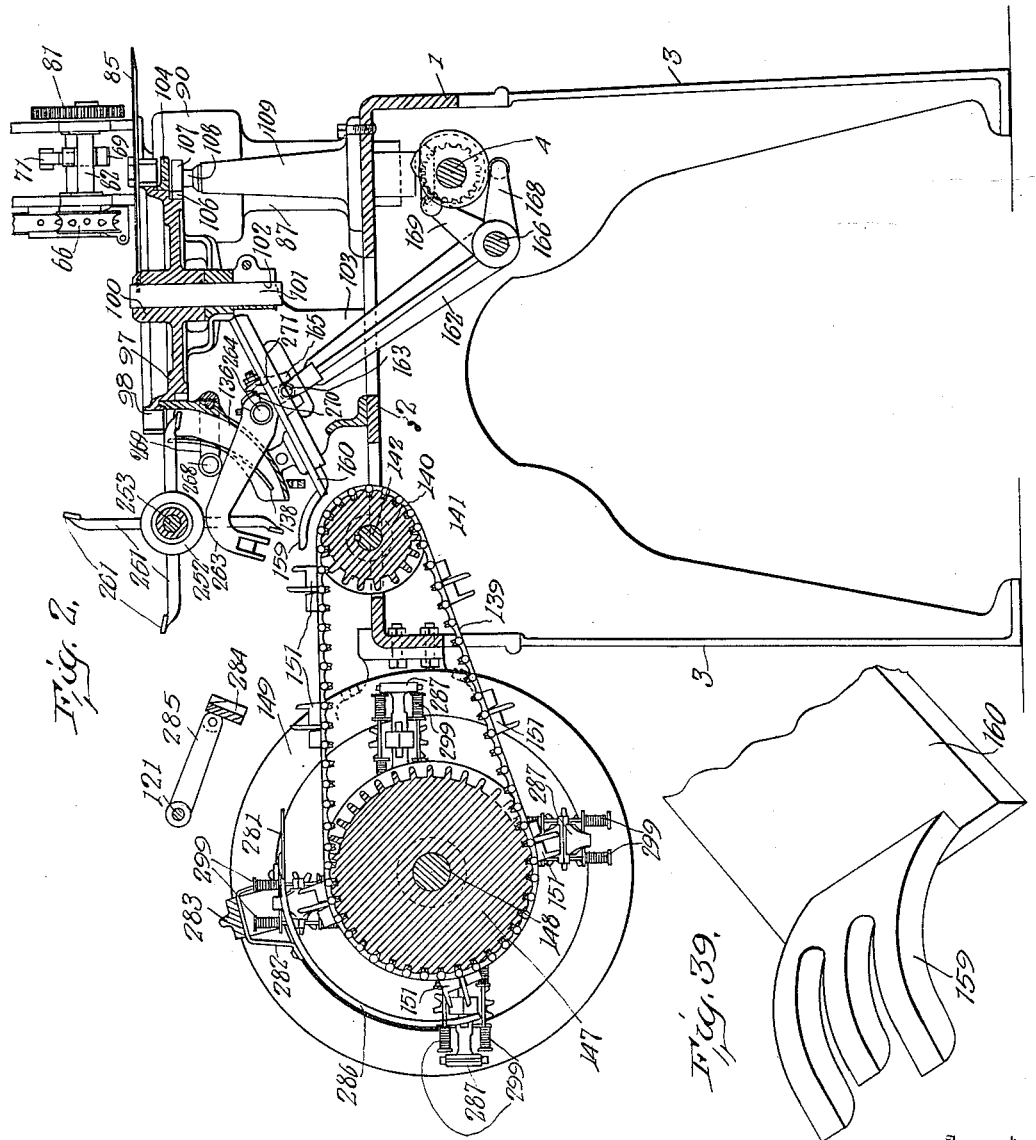

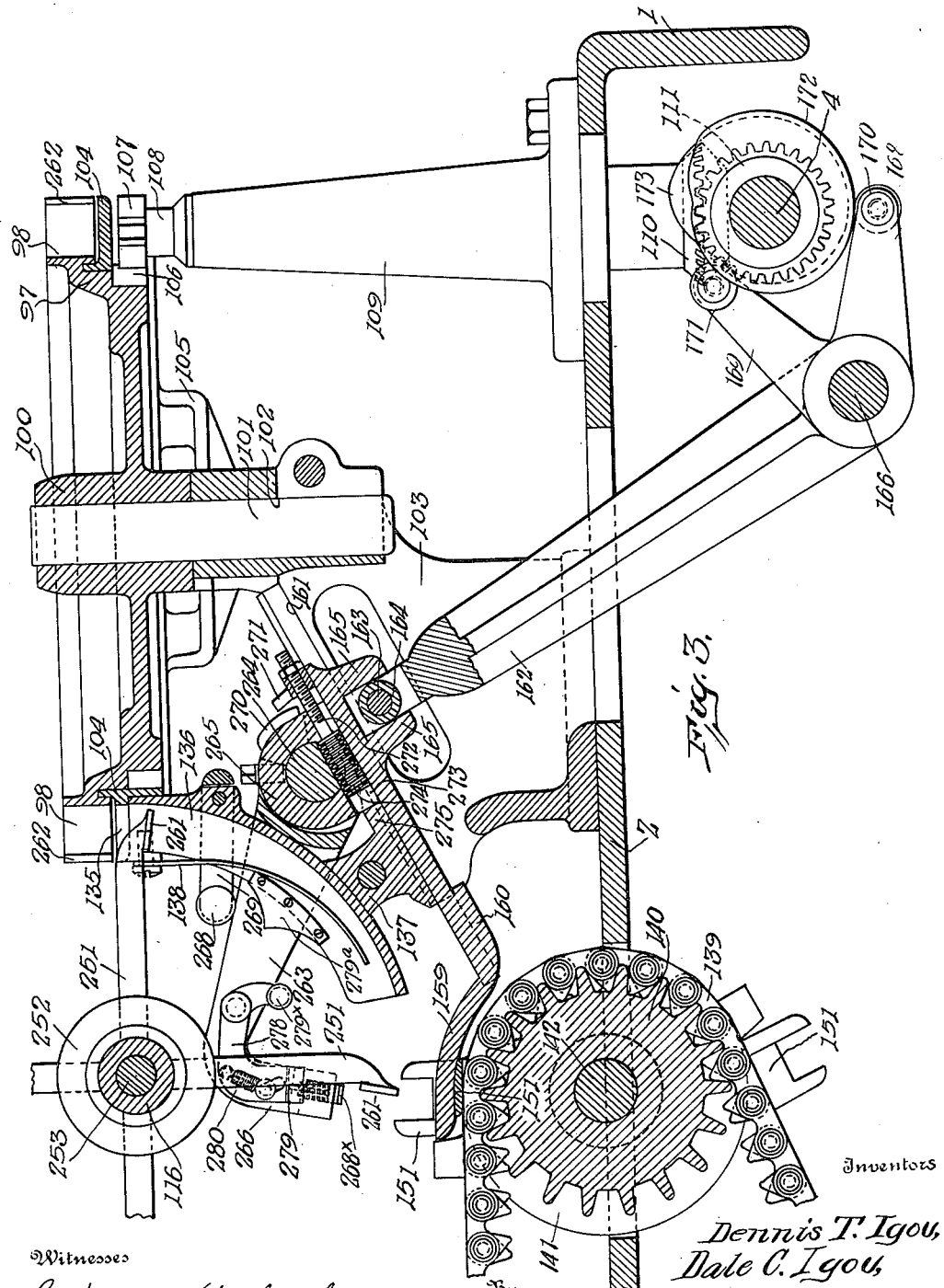

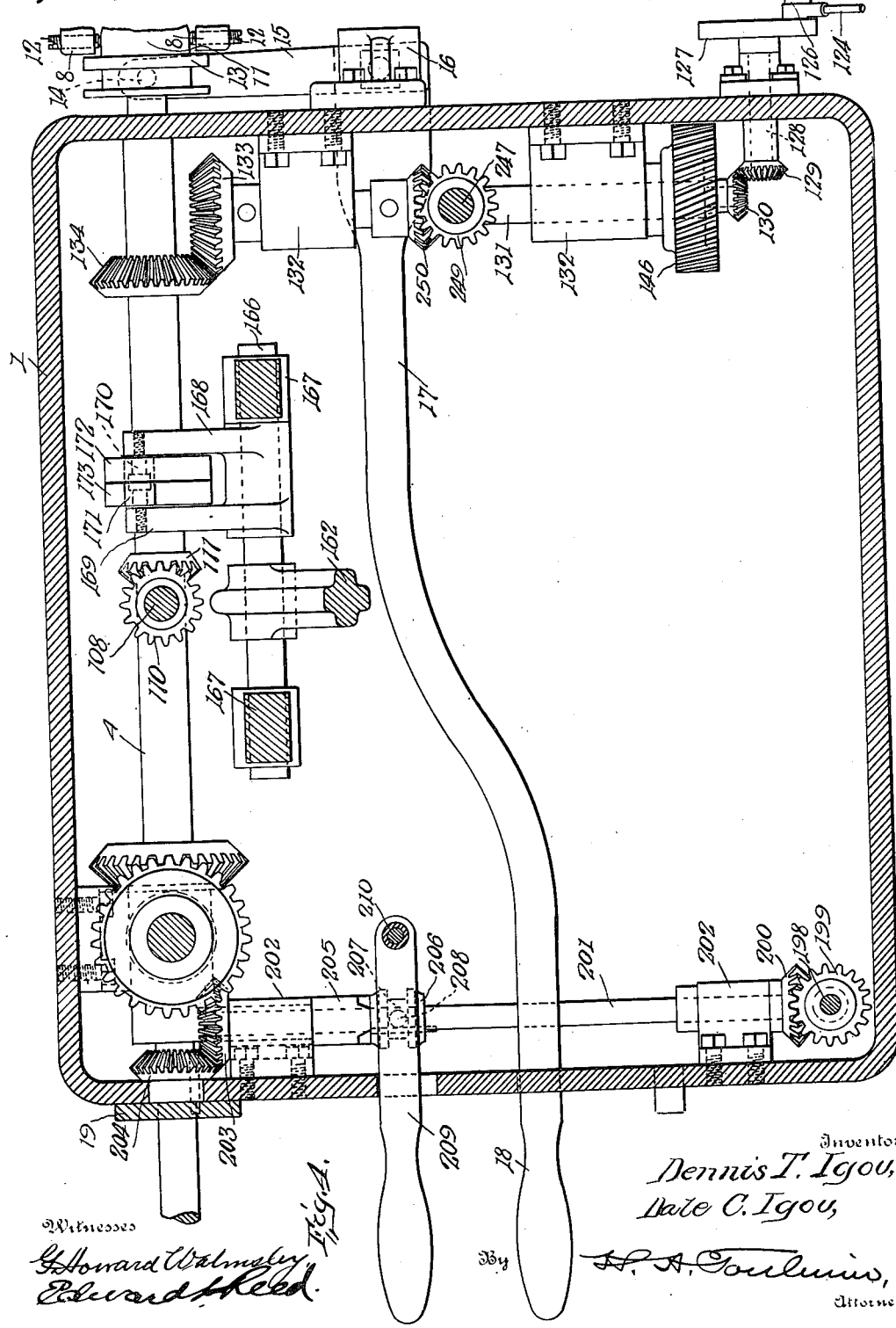

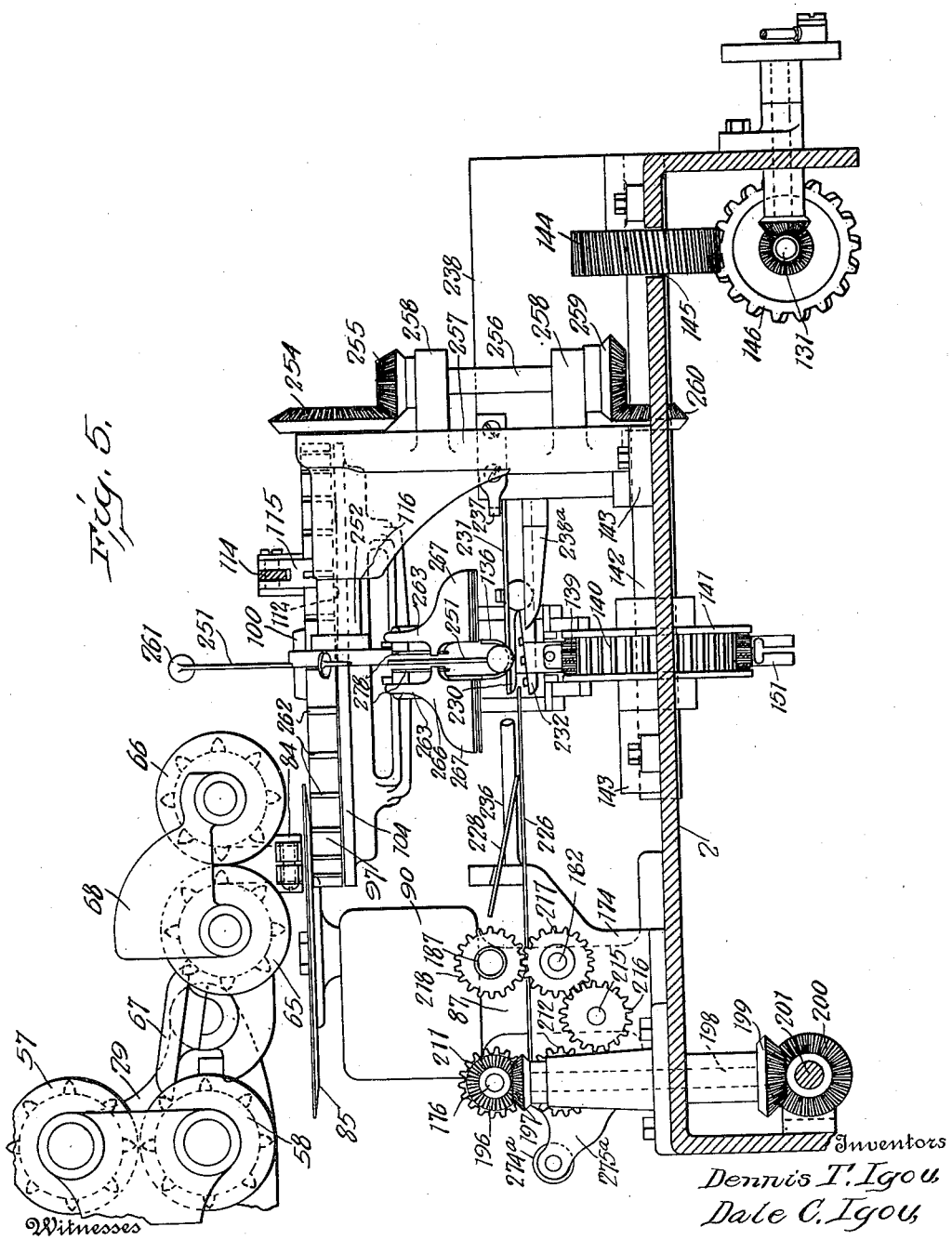

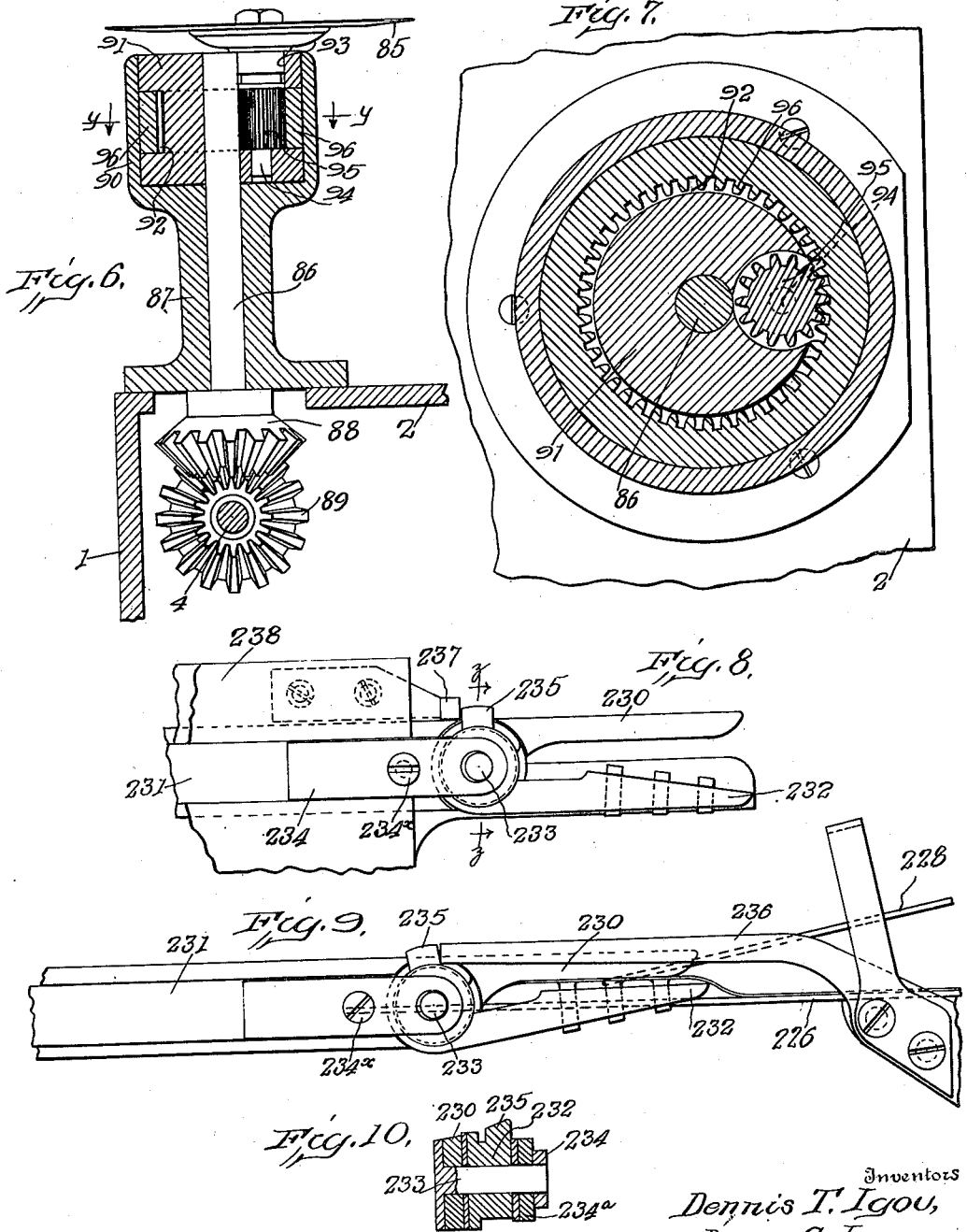

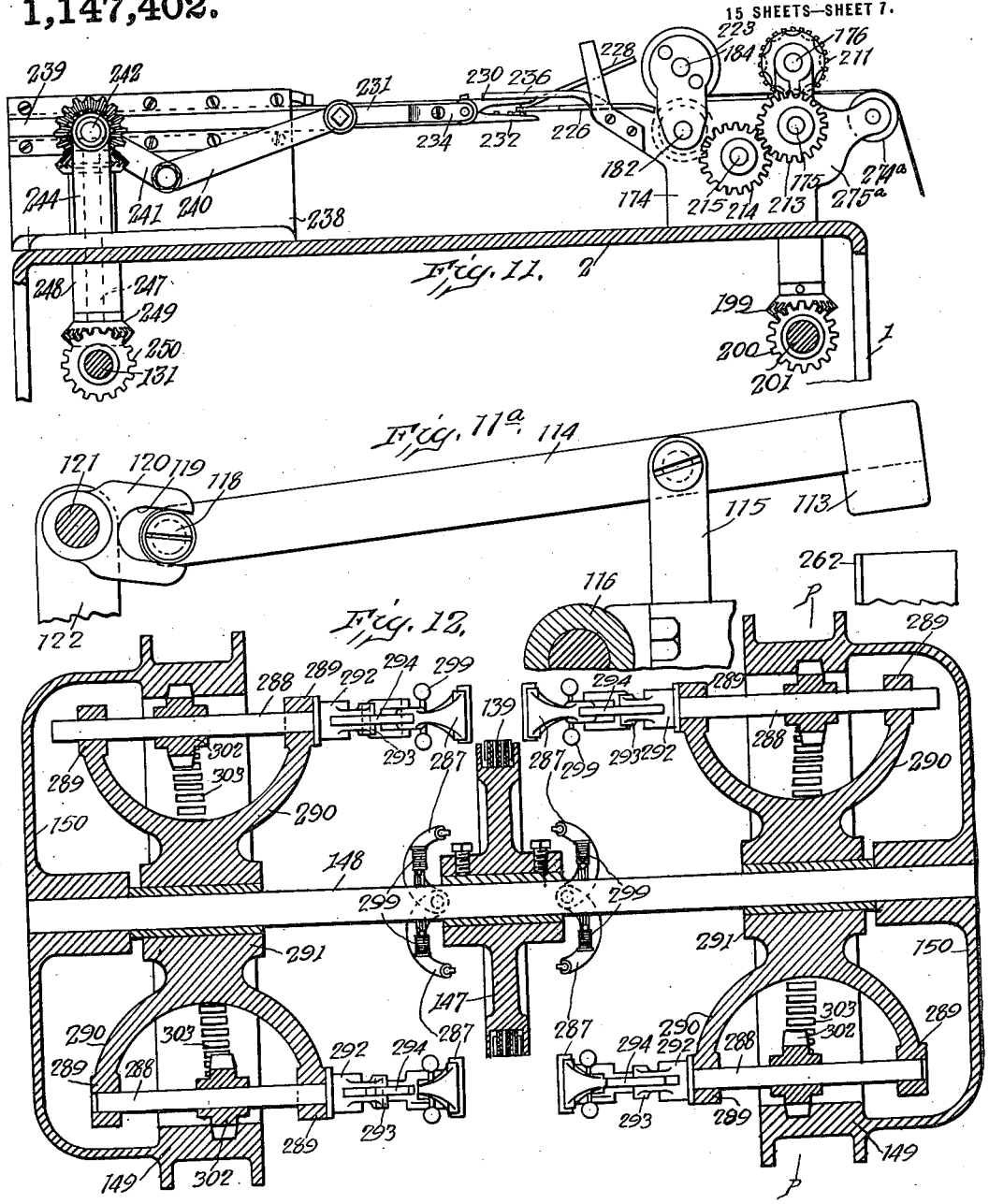

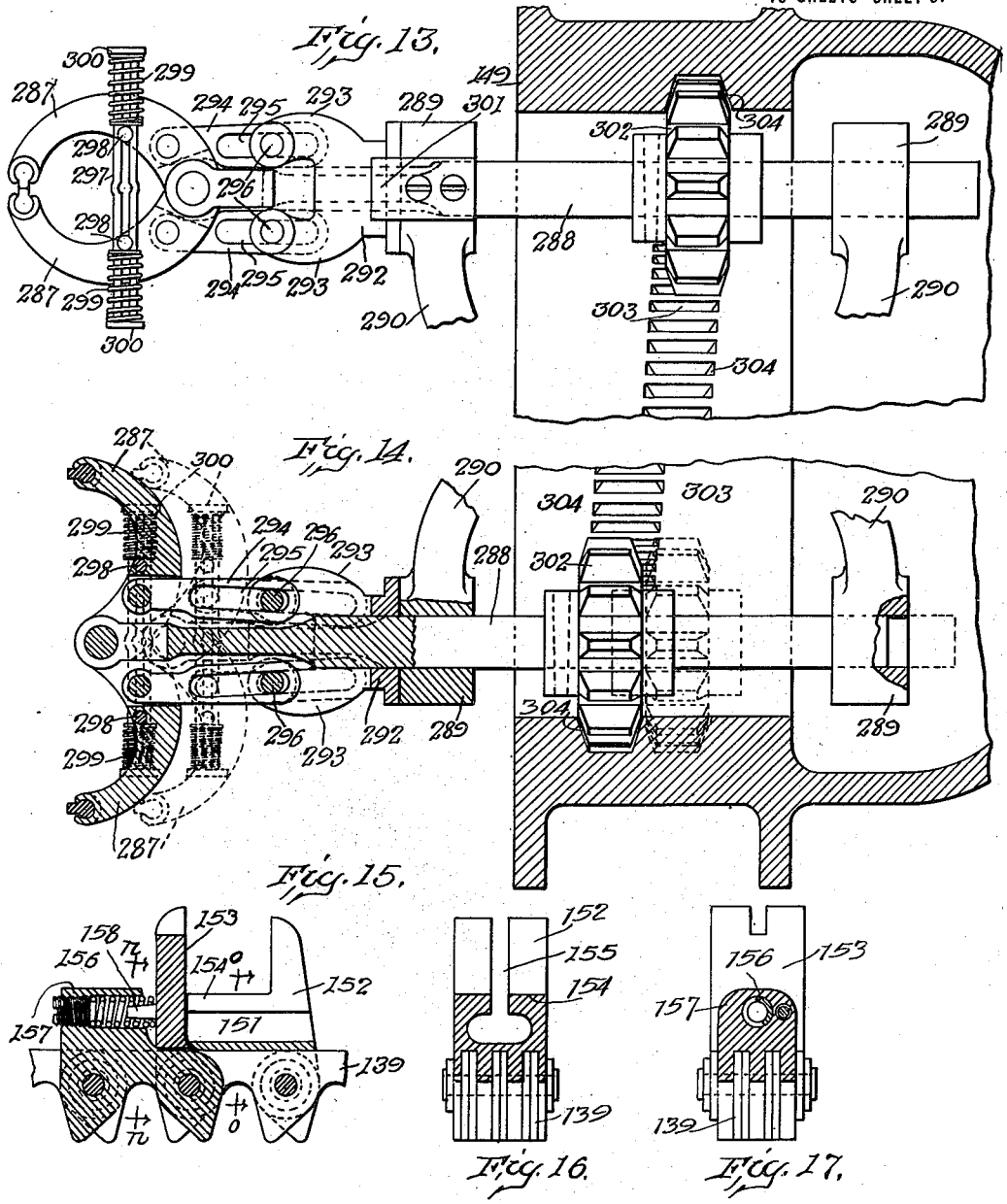

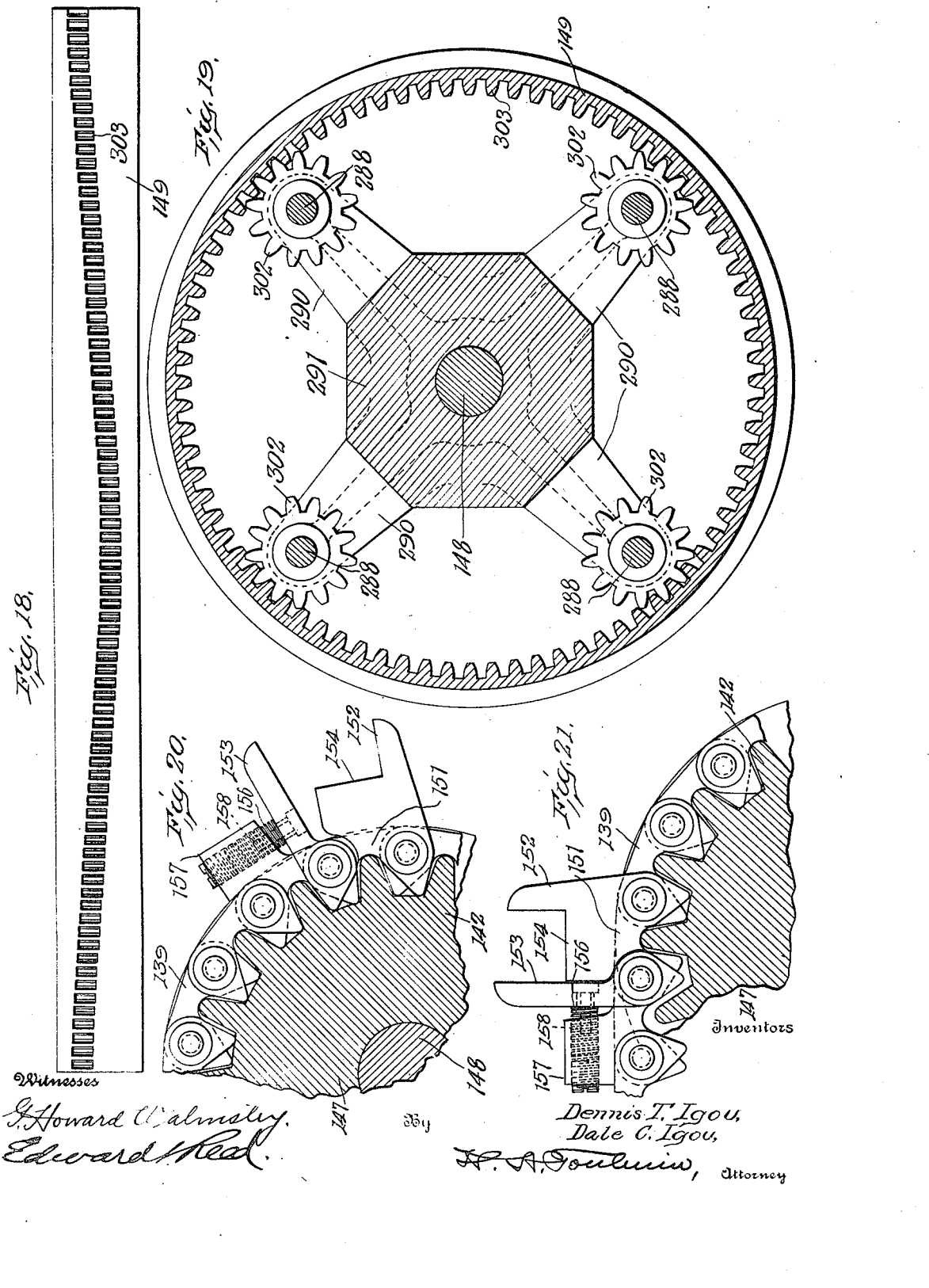

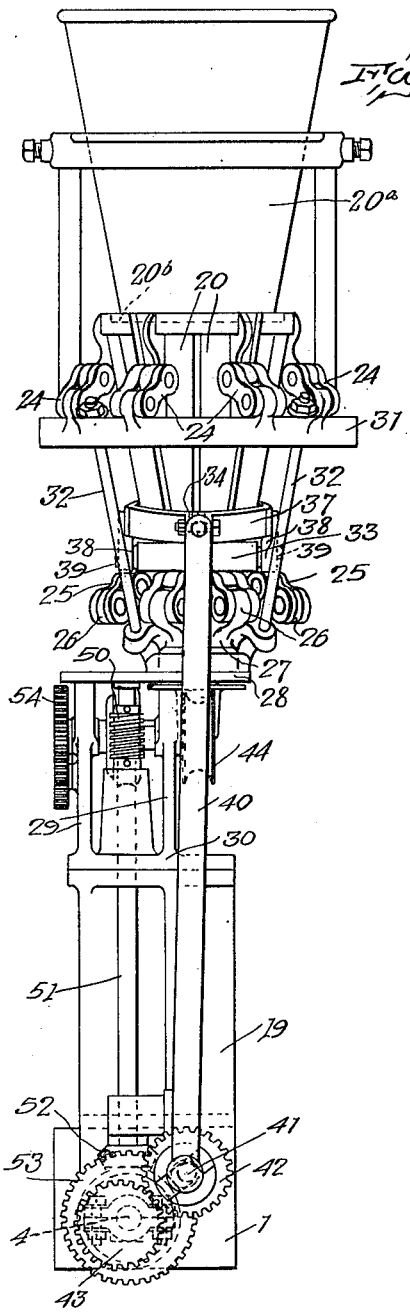

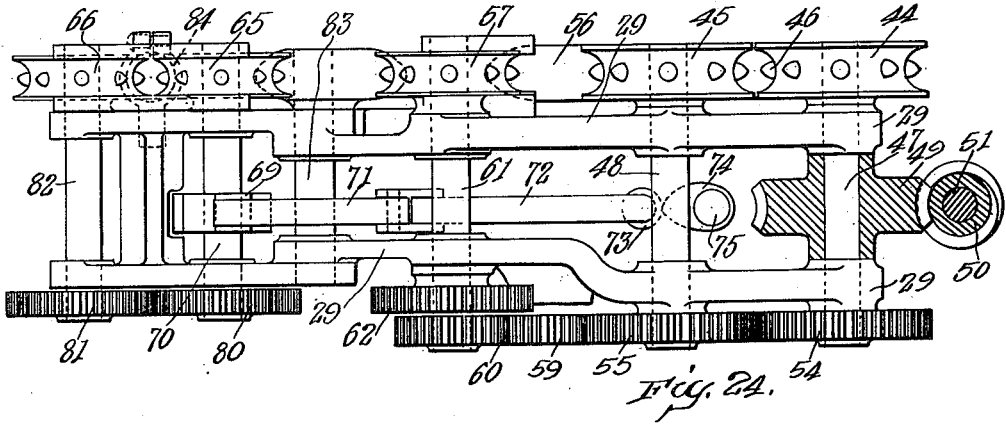
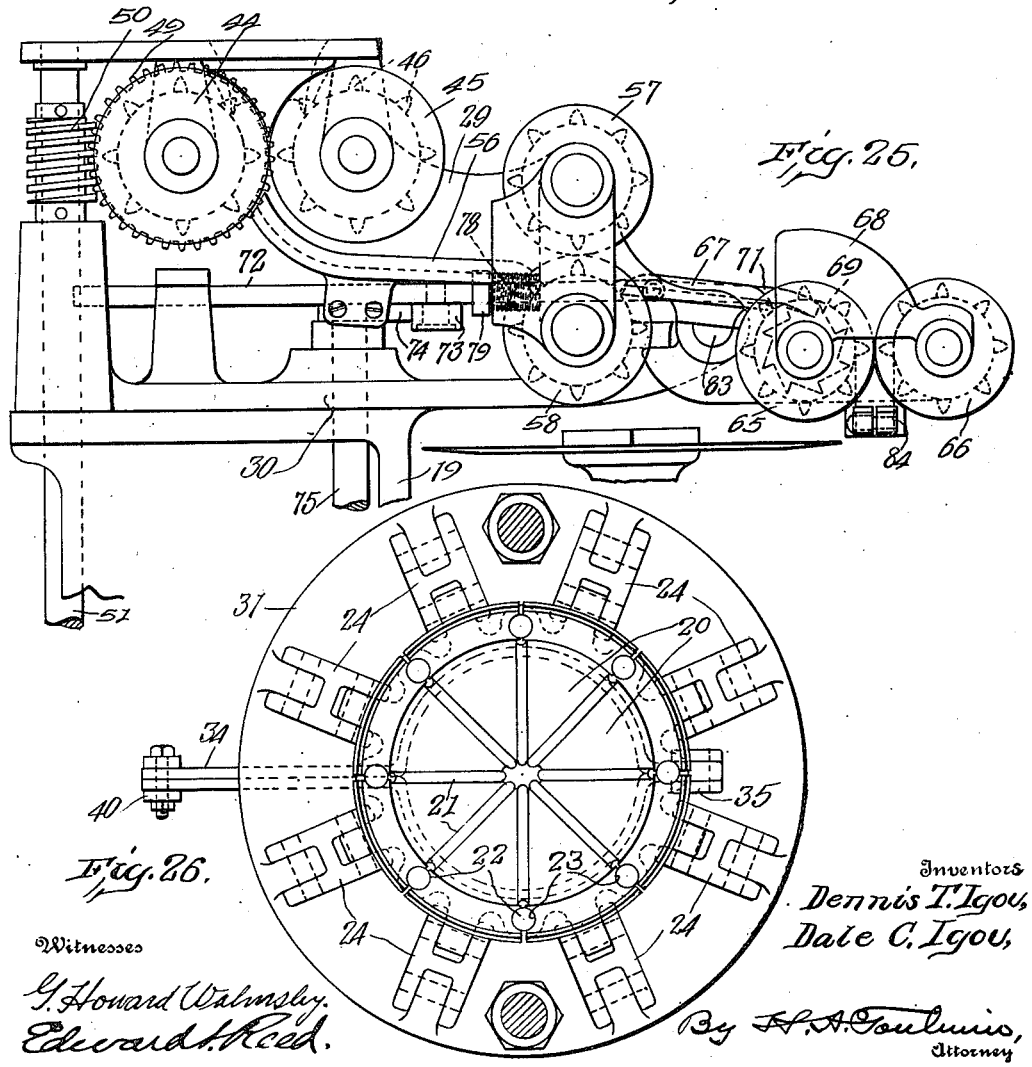

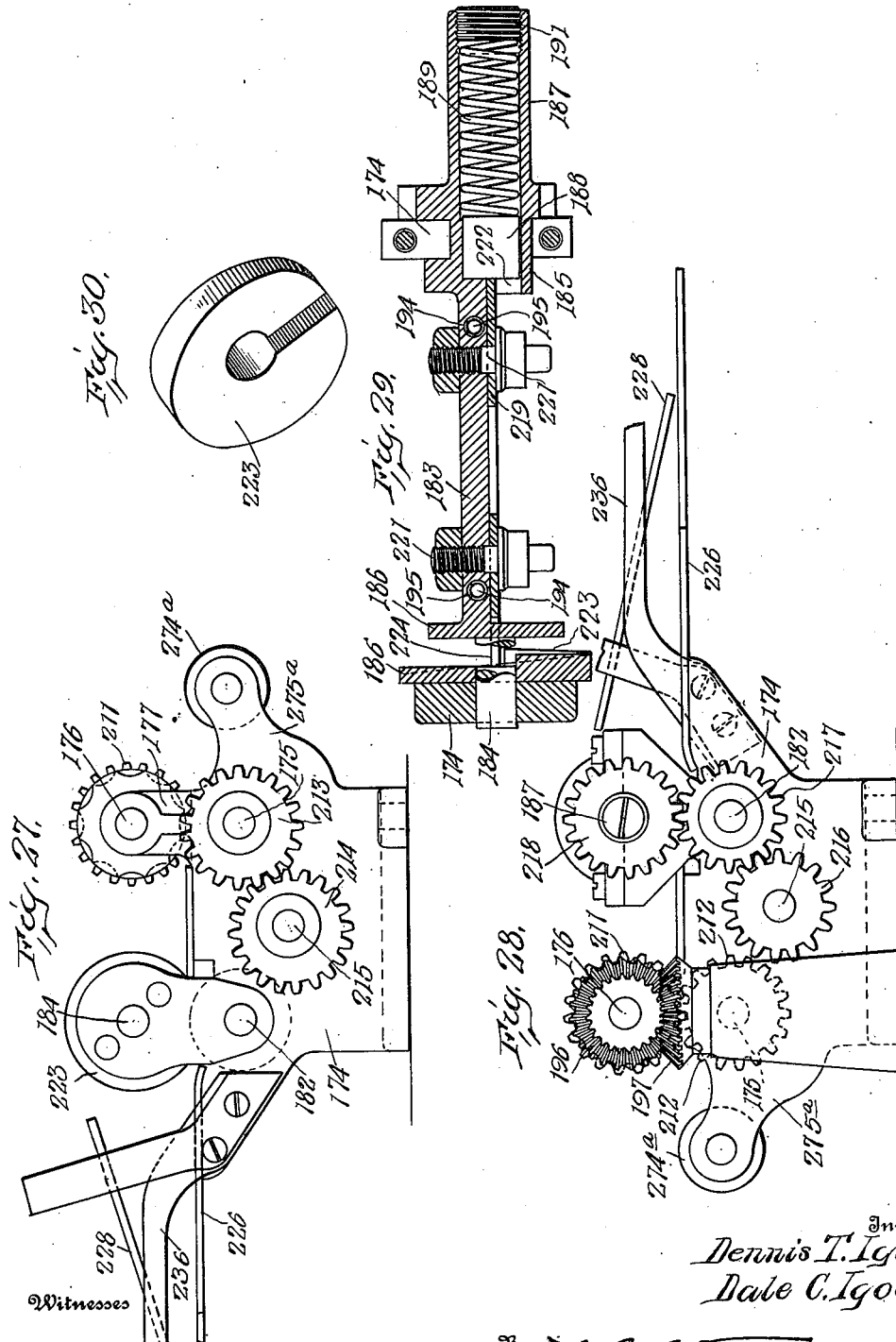

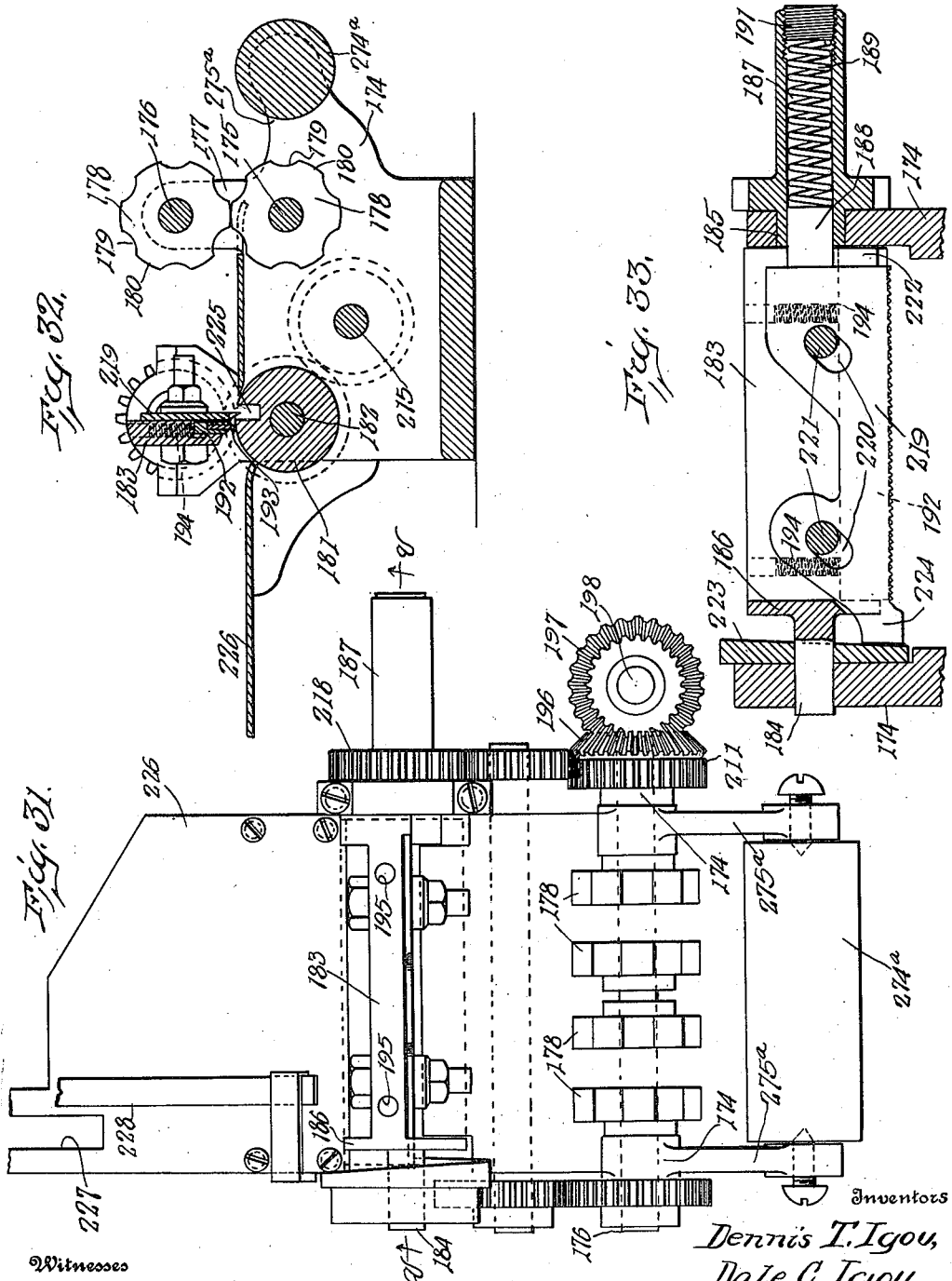

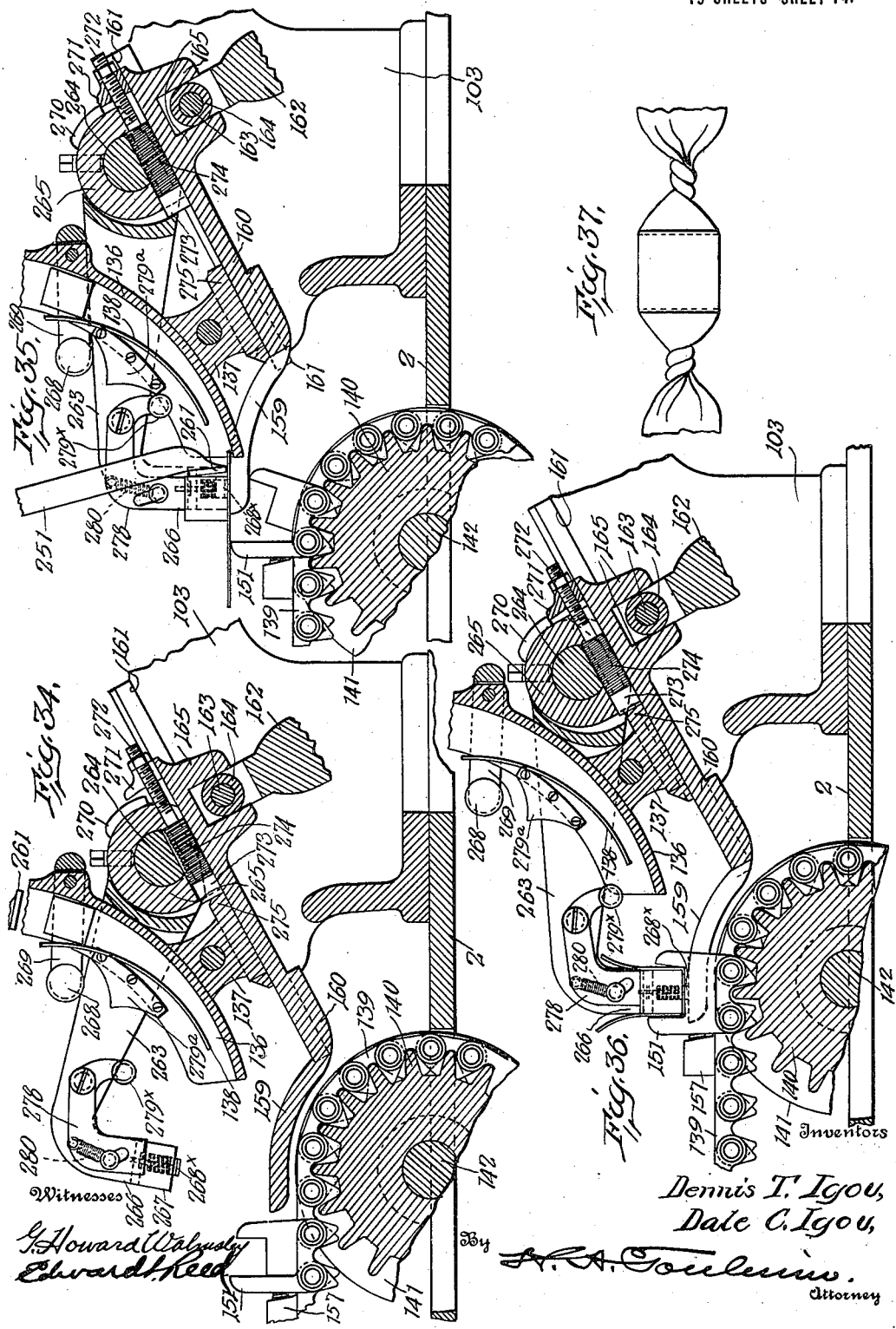

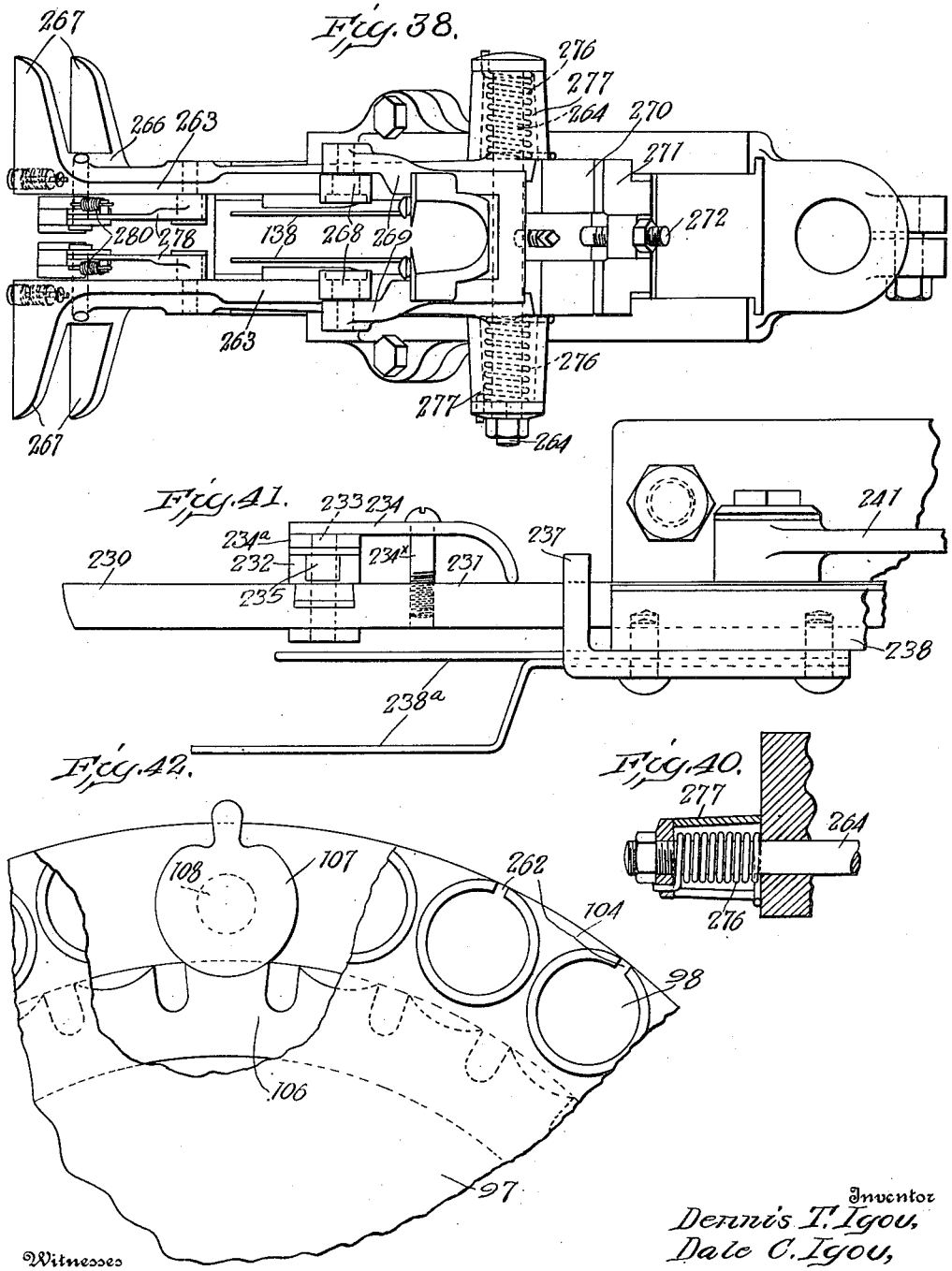

UNITED STATES PATENT OFFICE.

DENNIS T. IGOU AND DALE C. IGOU, OF SPRINGFIELD, OHIO, ASSIGNORS, BY MESNE ASSIGNMENTS, TO THE IGOU MANUFACTURING COMPANY, OF SPRINGFIELD, OHIO, A CORPORATION OF OHIO.

WRAPPING-MACHINE.

1,147,402.      Specification of Letters Patent.      Patented July 20, 1915.

Application filed September 19, 1910. Serial No. 582,671.

*To all whom it may concern:*

Be it known that we, DENNIS T. IGOU and DALE C. IGOU, citizens of the United States, residing at Springfield, in the county of Clark and State of Ohio, have invented certain new and useful Improvements in Wrapping-Machines, of which the following is a specification, reference being had therein to the accompanying drawings.

This invention relates to wrapping machines, and more particularly to machines designed to receive a batch of candy in a plastic condition, form the same into confections and wrap each confection separately without the assistance of manual labor.

The object of the invention is to provide a machine of this character which will be simple in its construction and operation, thereby enabling the machine to be operated and maintained in working condition by unskilled labor; and to provide such a machine which will operate at a high rate of speed and with a high degree of accuracy.

To this end it is a further object to so construct the machine and arrange the several parts thereof that each movement of the confection shall be a forward movement; and that the wrapper shall be placed about the confection and the wrapping completed while the confection is in motion.

It is also an object of the invention to so construct and arrange the several parts thereof that the confection will at all times during its passage through the machine be within the sight of the operator and will be readily accessible should this for any reason be desirable.

A further object of the invention is to provide a machine of this character which will so wrap the confection that the twisted ends of the wrapper will extend transversely to the length of the confection.

In the accompanying drawings, Figure 1 is a top, plan view, partially broken away, of a machine embodying our invention; Fig. 2 is a longitudinal, sectional view taken centrally of the machine; Fig. 3 is a sectional view of the upper portion of the supporting frame and the parts mounted thereon taken centrally thereof; Fig. 4 is a horizontal, sectional view taken just below the top of the main frame; Fig. 5 is a transverse, sectional view, taken on the line $x$ $x$ of Fig. 1 and looking in the direction of the arrows; Fig. 6 is a sectional, detail view of the cutter and its operating mechanism; Fig. 7 is a transverse, sectional view of the same taken on the line $y$ $y$ of Fig. 6 and looking in the direction of the arrows; Fig. 8 is a detail view of the paper-gripping jaws showing the same in their open position; Fig. 9 is a similar view showing the jaws in their closed position; Fig. 10 is a sectional, detail view taken on the line $z$ $z$ of Fig. 8 and looking in the direction of the arrows; Fig. 11 is a vertical, section taken on the line $v$ $v$ of Fig. 1 and looking in the direction of the arrows; Fig. 11$^a$ is a detail view of the sizer; Fig. 12 is a horizontal, sectional view taken centrally through the supporting and actuating mechanism for the twister; Fig. 13 is a detail view of one of the twisting jaws showing the same in its closed position; Fig. 14 is a similar view showing the jaw in its open position; Fig. 15 is a detail view of one of the receivers carried by the conveyer; Fig. 16 is a sectional view taken on the line $o$ $o$ of Fig. 15 and looking in the direction of the arrows; Fig. 17 is a sectional view taken on the line $n$ $n$ of Fig. 15 and looking in the direction of the arrows; Fig. 18 is a development of the cam gear which controls the operation of the twisters; Fig. 19 is a vertical, sectional view taken on the line $p$ $p$ of Fig. 12; Fig. 20 is a fractional detail view of one of the gears for the conveyer chain showing the position of the receiver jaws when passing about the gear; Fig. 21 is a similar view showing the closed position of the jaws; after the chain has assumed a horizontal position; Fig. 22 is an end elevation of the batch-supporting and reducing mechanism; Fig. 23 is a side elevation of the same; Fig. 24 is a top, plan view of the feeding and reducing rollers; Fig. 25 is a side elevation of the feeding and reducing rollers; Fig. 26 is a top, plan view of the diminisher with the hopper removed; Fig. 27 is a rear elevation of the paper-feeding and cutting mechanism; Fig. 28 is a front elevation of the same; Fig. 29 is a horizontal, sectional view of the spring-actuated knife forming a part of the feeding and cutting mechanism; Fig. 30 is a detail of the cam plate controlling the action of said knife; Fig. 31 is a top, plan view of the feeding and cutting mechanism; Fig. 32 is a longitudinal, sectional view taken vertically of the same; Fig. 33 is a transverse, sectional view taken on the line q q of Fig. 31 and looking in the direction of the arrows; Fig. 34 is a sectional, detail view showing the initial position of the paper support, inserter and confection; Fig. 35 is a similar view showing these parts in a second position; Fig. 36 is a similar view showing the parts still further advanced and the wrapper and confection inserted in the receiver on the conveyer chain; Fig. 37 is a detail view of the confection completely wrapped; Fig. 38 is a top, plan view of the inserter and its operating mechanism; Fig. 39 is a detail view of the support for the wrapper; Fig. 40 is a sectional, detail view showing the spring which actuates the inserter arms; Fig. 41 is a top, plan view of a portion of the gripping jaws and their operating mechanism; and Fig. 42 is a detail view of the actuating gearing for the carrier.

In these drawings we have illustrated one embodiment of our invention and have shown the same as applied to a confection forming and wrapping machine. This machine comprises a support adapted to receive a batch of candy in a plastic condition and deliver the same to suitable reducing and feeding mechanism which draws the candy into a bar of suitable and uniform diameter and feeds this bar to a cutting device which divides the same into small portions or confections. The confections thus formed are delivered to a carrier which, in turn, delivers them to the wrapping mechanism. During the passage from the cutting device to the wrapping mechanism the confections are tempered and are reduced to a uniform size. After being discharged from the carrier the confections, with their wrappers, are delivered to a conveyer which presents them in succession to folding and twisting devices which complete the wrapping of the confection and then discharge the completely wrapped confection from the machine.

The several mechanisms comprising the machine may, of course, be arranged and supported in any suitable manner. In the present instance we have shown the several mechanisms as mounted upon a main frame 1 comprising a flat top or supporting surface 2 and mounted upon vertical standards or legs 3. Extending transversely to the main frame near the rear end thereof and below the top thereof is a main driving shaft 4 which is journaled in the side members of the main frame and extends for some distance on the opposite sides of that frame. A suitable driving wheel, such as a belt wheel 5, is loosely mounted on that portion of the shaft 4 which projects beyond one side of the main frame and is adapted to be connected to and disconnected from a shaft by suitable clutch mechanism under the control of the operator. This mechanism is here shown as comprising a friction drum 6 rigidly secured to the driving wheel and adapted to coöperate with friction shoes 7 carried by levers 8 pivotally mounted upon lugs 9 carried by a sleeve 10. This sleeve is rigidly secured to the shaft 4 and the ends of the levers 8 on that side of the sleeve opposite the driving wheel 5 extend some distance beyond the end of the sleeve and are adapted to be actuated by a cone 11 slidably mounted on the shaft 4. The ends of the levers are preferably provided with adjustable stops 12 arranged to engage the cone 11 and regulate the amount of pressure exerted on the shoes 7. The cone may be actuated in any suitable manner, but, as here shown, is provided with the usual grooved collar 13 into which extend pins 14 carried by the arms of a yoke 15. This yoke is pivotally mounted upon a bracket 16 rigidly secured to one side of the main frame 1 and has rigidly secured thereto an arm 17 which extends transversely to the main frame and is provided on the opposite side thereof with a handle 18, by means of which the arm 17, yoke 15 and cone 11 may be actuated. From this main driving shaft 4 all of the mechanism comprising the machine are actuated.

The support for the batch of candy and the reducing and feeding mechanism are here shown as supported on a bracket 19 rigidly secured to one side of the main frame, in the present instance that side opposite the side on which the driving wheel is mounted, and at a point near the rear end thereof. It will be understood that in this description the direction in which the confections move in their passage through the machine is considered the forward direction, and, consequently, the front end of the machine is the end at which the wrapped candy is discharged and the rear end is the end at which the batch is supported. The support employed in the present machine also constitutes a diminisher which so shapes the lower end of the batch as to enable it to be acted upon by the reducing and feeding rollers. This support or diminisher comprises a cone-shaped receptacle arranged in a substantially vertical position and open at both its upper and its lower ends. The walls of the receptacle are made up of a series of tapered sections or staves 20 which are so supported as to be movable toward and away from a vertical line extending centrally to the receptacle and also to have a vertical movement, the combined movements serving to compress the batch of candy into a cone-shape and to draw the same downward toward the reducing and feeding rollers. To permit of these movements the several sections 20 are arranged short distances apart and the spaces between the adjacent edges of the sections are closed by means of strips of resilient material. In the present instance we have employed strips of soft rubber, as indicated at 21. These strips are provided with thickened central portions 22 extending beyond the opposite sides of the body of the strip and adapted to enter recesses 23 formed in the edges of the sections of the diminisher. The movement of the sections relative one to the other is slight and the resiliency of the soft rubber enables the same to be contracted and to expand with the movements of the sections, thereby keeping the spaces between the sections closed and preventing the candy from entering the same. A hopper 20$^a$ is rigidly supported above the diminisher and a gasket 20$^b$ of rubber or other resilient material is interposed between the upper ends of the sections 20 and the hopper to permit of the vertical movement of the sections and prevent the material escaping between the hopper and diminisher. Similar gaskets are placed between the lower ends of the sections and the supporting member.

The desired movements may be imparted to the several sections 20 of the diminisher in any suitable manner and we have here shown one method of imparting these movements to the sections which we have found satisfactory. Each section has pivotally connected thereto near its upper and lower ends links 24 and 25, respectively. The links 25, which are connected at one end to the sections 20 near their lower ends, are connected at their opposite ends to pivot lugs 26 carried by and preferably formed integral with an annular supporting member 27. This supporting member is mounted on a plate 28 carried by two side members 29 of a bracket 30, which, in turn, is mounted upon the bracket 19 and which serves as a support both for the diminisher and for the reducing and feeding devices. The links 24 which are connected to the upper ends of the sections 20 are pivotally connected at their outer ends to an annular support 31 which extends about the diminisher and which is connected to the lower annular support 27 by means of rods 32. Vertical movement is imparted to the sections of the diminisher by means of a ring 33 extending about the lower end of the diminisher immediately above the inner ends of the lower series of links 25. A stop 34$^a$ is rigidly secured to each section of the diminisher immediately above the ring 33 and these stops, together with the inner ends of the links 25 and the lugs to which these links are pivoted, serve to limit the vertical movement of the ring. This ring is actuated by means of a lever 34 pivotally connected at one end to a fixed part of the machine. In the present instance this connection is made by means of a link 35 pivotally connected at one end to the adjacent end of the lever and pivotally connected at its other end to a part, such as an arm 36, which is rigidly secured to the plate 28 of the bracket 30. The lever 34 is provided with an annular portion, as indicated at 37, which extends loosely about the diminisher just above the ring 33 and is connected to that ring by means of bearing lugs 38 depending therefrom and arranged to receive trunnions 39 rigidly secured to the opposite sides of the ring 33. The movable end of the lever 34 is connected by means of a pitman 40 with a crank pin 41 carried by a gear 42 mounted on the bracket 19 and meshing with a second gear 43 mounted on the driving shaft 4. It will be apparent that the movement of the lever 34 will raise and lower the ring 33, and as the movement of the ring relative to the sections of the diminisher is limited, as above described, the movement of the ring will cause a corresponding movement of the sections 20 of the diminisher. The vertical movement of the sections causes the links 24 and 25 to be moved about their pivotal connections to the fixed supports, and, consequently, the sections are moved inward or outward a distance corresponding to the movement of the links about their pivotal centers. In this manner there is successively imparted to the sections an inward and downward movement and an upward and outward movement. The inward and downward movements serve to compress and draw downward the lower end of the batch of candy. The upward and outward movements of the sections increase the diameter of the diminisher and permit the batch of candy to drop downward. In this lower position it is again engaged by the sections as they again move inward and downward.

The supporting plate 28 of the bracket 30 has an opening formed therein immediately beneath the opening in the annular support 27 and supported from the bracket beneath this opening are two feeding and reducing rollers 44 and 45. These rollers are of a known construction and each is provided in its periphery with a groove and the two rollers are arranged with their axes in substantially the same horizontal plane and with their peripheries in engagement, and, consequently, a vertical passage is formed between the rollers. The arrangement of the rollers is such as to bring this passage directly beneath the opening in the lower end of the diminisher. The rollers may, if desired, be provided with pins 46 arranged within the grooves to increase the gripping action of the rollers and facilitate the feeding of the candy and the drawing of the same from the batch. These rollers are here shown as mounted upon shafts 47 and 48 journaled in the side members 29 of the bracket 30, which bracket extends inwardly toward the main frame. The shafts extend beyond the two side members 29 and the feeding rollers 44 and 45 are mounted upon the projecting ends of the shafts on one side of the bracket and in this manner are supported in a position in which they are readily accessible. The shaft 47 has mounted thereon between the two side members of the frame a worm wheel 49 which meshes with a worm 50 mounted on a vertical shaft 51, which, in turn, is mounted in bearings carried by the bracket 19 and has at its lower end a bevel pinion 52 which meshes with a bevel gear 53 mounted on the driving shaft 4. The shafts 47 and 48 have mounted on those ends opposite the ends on which the rollers are mounted intermeshing gears 54 and 55, by means of which movement is imparted from the shaft 47 to the shaft 48 and the two rollers 44 and 45 are caused to rotate in opposite directions. The bar of candy as it passes between the rollers 44 and 45 engages a curved guide or chute 56 and is guided thereby to a second pair of feeding and reducing rollers 57 and 58. These rollers are similar in construction to the rollers 44 and 45, but are somewhat smaller and have their axes arranged in a vertical plane so as to present a substantially horizontal opening for the passage of the bar of candy. They are preferably driven from the gear 55 which rotates the shaft 48 of the roller 45, this being accomplished by means of an intermediate pinion 59 meshing with the gear 55 and with a gear 60 mounted on a shaft 61 of the upper roller 57. A second gear 62, also mounted on the shaft 61, meshes with a gear 63 mounted on a shaft 64 of the lower roller, thereby rotating these rollers in opposite directions. The bar of candy passes from the second pair of reducing and feeding rollers 57 to the third and final pair of rollers. These rollers, which are indicated at 65 and 66, have their axes arranged in a substantially horizontal plane so that the bar is discharged therefrom in a substantially vertical plane. The space between the second and third pair of rollers is bridged by a chute 67 and a suitable guard 68 is mounted upon the side members of the frame, extends above the path of the bar of candy and serves to direct the same downward between the two rollers 65 and 66. This third pair of rollers are actuated intermittently so as to feed the bar of candy forward equal distances at fixed intervals. This intermittent movement of the rollers may be accomplished in any suitable manner, but we have here shown a pawl and ratchet mechanism for imparting this movement to the roller 65. This mechanism comprises a ratchet wheel 69 mounted on a shaft 70 of the roller 65. A pawl 71 has one end arranged to engage the teeth of the ratchet 69 and is pivotally connected at its other end to the adjacent end of a reciprocating rod 72 which is slidably mounted in suitable bearings supported by the side members 29 of the frame 30 and has between its ends a projection 73 arranged in the path of a cam 74 mounted on the upper end of a vertical shaft 75 journaled in bearings in the brackets 19 and having at its lower end a bevel pinion 76 meshing with a corresponding pinion 77 on the drive shaft 4. Thus, at each revolution of the shaft 75 the rod 72 and pawl 71 will be moved forward and the ratchet wheel and the roller 65, with which it is connected, rotated through the space of one tooth. A spring 78 is coiled about the rod 72 and is confined between one of the bearings for the rod and a collar 79 rigidly secured to the rod and serves to retract the rod after each forward movement thereof. A movement corresponding to the movement of the roller 65 is imparted to the roller 66 by means of a gear 80 mounted on the shaft 70 of the roller 65 and meshing with a similar gear 81 mounted on a shaft 82 of the roller 66. Those portions of the side members 29 of the frame 30, in which the shafts 70 and 82 of the rollers 65 and 66, respectively, are journaled, are pivotally connected to the main portions of the side members of that frame, as shown at 83, thereby enabling the end of the frame and the rollers 65 and 66 to be moved into a substantially vertical position to permit access to the parts arranged within the same and to be herein described. A tube or chute 84 is preferably provided to form a guide for the bar of candy as it leaves the last pair of rollers 65 and 66.

A suitable cutting device is arranged to act upon the bar of candy as it leaves the feeding and reducing rollers and to divide the same into small portions or confections. This cutting device is here shown as a rotary disk cutter 85 connected with and arranged eccentrically to the upper end of a vertical shaft 86 journaled in a bearing 87 mounted on the top 2 of the main frame 1 and having at its lower end a bevel pinion 88 meshing with a corresponding pinion 89 on the driving shaft 4. Mounted on the upper end of the bearing 87 and preferably formed integral therewith is a housing 90 substantially cylindrical in shape and having its upper end open. Mounted within the housing 90 and rigidly secured to the upper end of the shaft 86 is a cylindrical block 91 having formed therein an annular groove 92. The block 91 also has a vertical bearing 93 in which is journaled a shaft 94 carrying the cutter 85. Rigidly secured to the shaft 94 at a point adjacent the groove 92 is a pinion 95 which meshes with a rack 96 carried by the inner wall of the cylindrical housing 90 and fixed against movement relative thereto. Thus, it will be seen that as the shaft 86 is rotated, the disk cutter 85 will revolve about the axis of that shaft and will also rotate about the axis of the shaft 94. This disk is so arranged that each revolution thereof about the shaft 86 will carry it across the lower end of the discharge tube 84 and cause it to sever that portion of the bar of candy which extends beyond the end of that tube. The cutter passes close to the lower end of the tube and the latter serves to hold the bar of candy against displacement when engaged by the cutter and enables a clean, smooth cut to be made.

The confections which are severed from the bar are received by a carrier which conveys the same to the point at which they are delivered to the wrapping mechanism. This carrier, as here shown, comprises an annular frame 97 having a series of pockets 98 open at the upper and lower ends and of a size corresponding approximately to the size of the confection. In the present instance this annular frame 97 is secured to the outer ends of a series of radial spokes or arms 99 which connect the same to a hub 100 which is rotatably mounted on a vertical shaft 101 fixed in a socket 102 carried by a bracket 103 secured to the top 2 of the main frame 1. The spaces between the arms or spokes 99 may, if desired, be closed to prevent the passage of chips or particles of candy which may fly from the cutter. An annular plate 104 is arranged beneath the series of pockets 98 and forms the bottoms of these pockets. This plate is rigidly secured to a fixed part of the machine and has no movement relative thereto. In the present machine we have shown the plate as carried by a series of arms 105 which are rigidly secured to the socket 102. It will be noted that the plate or ring 104 is spaced a short distance away from the lower edge of the pockets 98, thus increasing the depth of the pockets. The carrier is so arranged relative to the discharge tube 84 of the feeding and reducing rollers that the several pockets will pass successively beneath this tube and each will receive a confection. The carrier is actuated intermittently and its movements are so timed that they will take place during the interval between the movements of the intermittently movable feeding rollers. This intermittent movement of the carrier may be secured in any suitable manner. In the present instance we have provided the carrier with an annular rack 106 which is here shown as arranged immediately beneath the annular frame 97 and in substantially the same horizontal plane with the arms or spokes 99. The annular frame 97 is mounted on or connected to the upper edges of the spokes so as to elevate the pockets 98 above the level of the spokes of the carrier. The teeth of this rack are preferably spaced some distance apart and those portions of the rack lying between the teeth project outward a distance almost equal to the length of the teeth and have their outer edges concave. A one tooth gear 107 is arranged near the rack to actuate the same. This gear is preferably mounted upon the upper end of a shaft 108 rotatably mounted in a bearing 109 mounted on the top of the main frame and has at its lower end a bevel gear 110 meshing with a corresponding gear 111 secured to the driving shaft 4. The body of the gear 107 is substantially cylindrical and is adapted to engage the concave edges of those portions of the rack lying between the teeth and rack to hold the rack against movement during the rotation of the gear, thereby preventing any displacement of the pockets 98 relative to the discharge tube 84. The annular frame 97 is so arranged that the upper ends of the pockets 98 are in a plane slightly lower than the discharge tube 84, the space between the two parts being just sufficient to permit the passage of the cutter 85. Consequently, the end of the bar of candy which is to form the confection will be fed into the pocket before it is severed from the body portion of the bar. By spacing the annular plate, which forms the bottoms of the pockets, away from the lower edge of the frame, the depth of the pockets is increased and the length of the confection when it is severed from the bar is slightly greater than the depth of the pocket proper.

The confection when severed from the bar of candy is in a more or less warm and soft condition, and, during the interval consumed by the movement of the confections from the point where they are received by the carrier to the point where they are discharged, the confections will cool and shrink, the amount of this shrinkage depending upon the condition of the confection when it is received. Usually the first confections formed from a batch will be quite warm and soft and the shrinkage will be correspondingly great, but those formed from the latter part of the batch will be much cooler, and, consequently, the shrinkage will be correspondingly less. The lengths of the several confections when they are severed from the bar are the same. Therefore, the difference in shrinkage leaves the confections of different lengths, and, in order that the confections when wrapped may be of a uniform length, we have provided means for sizing each confection before it is discharged from the carrier. To this end we have arranged an inclined plate or strip 112 on that portion of the annular plate 104 immediately preceding the point of discharge of the confections from the carrier. The rear edge of this strip, where the confection first comes in contact with it, is very thin and the confection will readily pass onto the same. The strip gradually thickens until the upper surface thereof lies close to the lower edges of the pockets and the bottoms of the confections which are contained in the pockets are supported flush with the bottoms or lower edges of the pockets. Arranged above one of the pockets near the end of the strip 112 is a sizer comprising a vertically movable plunger 113 adapted to engage the top of each confection that extends above the top of its pocket and force the same down even with the top of the pocket. The plunger 113 is, in the present instance, carried by one end of a lever 114 which is pivotally mounted on a bracket 115 secured to one side of a bearing sleeve 116 carried by a bracket 257 for a purpose which will be hereinafter described. That end of the lever 114 opposite the plunger 113 is connected to suitable operating mechanism, and, as here shown, has extending laterally therefrom a pin 118 which extends through a slot 119 in an arm 120 rigidly secured to a rockshaft 121 which is journaled in bearings 122 formed in the ends of a bracket 123 carried by a fixed part of the machine. This rockshaft is actuated by means of a pitman 124 secured at one end to a crank arm 125 mounted on the rockshaft 121 and connected at the other end to a wrist pin 126 carried by a crank wheel 127 which is secured to the outer end of a shaft 128 journaled in the side of the main frame and having on its inner end a bevel pinion 129 meshing with a corresponding pinion 130 secured to the end of a countershaft 131. This countershaft is arranged longitudinally to the machine near one side thereof beneath the top 2. As here shown it is journaled in bearings 132 carried by the main frame and has at its rear end a bevel pinion 133 meshing with a corresponding pinion 134 on the driving shaft 4. The movement of the rockshaft 121 is so timed that the plunger 113 will move downwardly during the interval when the carrier is at rest, and the plunger is so arranged with relation to the carrier that when the latter is stationary, one of the pockets will be immediately beneath the plunger.

At the point where the confections are to be discharged from the carrier the annular plate 104 is provided with a recess 135 corresponding substantially to the diameter of the pockets 98. Arranged immediately below the recess 135 is the upper end of a curved chute 136 which extends downwardly and forwardly therefrom and is rigidly supported by a lug 137 carried by the bracket 103. Suitable retarding devices, such as the resilient wire fingers 138, are arranged within the chute to check the downward movement of the confection and prevent the same from passing out of the chute by gravity. The confections are ejected from the chute 136 at fixed intervals and are delivered, together with a suitable wrapper, to a conveyer which carries the same forward and presents the wrapper successively to a folding device which completes the folding thereof and to twisting devices which twist the ends of the wrapper, after which the wrapped confection is discharged from the machine. The conveyer here shown comprises a well known form of driving chain, as indicated at 139, which passes over a gear 140 having flanges 141 arranged on each side thereof to prevent the lateral displacement of the chain. This gear is rigidly mounted on a shaft 142 journaled in bearings 143 on the top 2 of the main frame 1 and having mounted thereon a worm wheel 144 which extends through a slot 145 formed in the top 2 of the main frame and meshes with a worm 146 mounted on the shaft 131 beneath the top of the frame. The conveyer or chain 139 also extends about a second gear 147 similar to, but somewhat larger than the gear 140. This second gear 147 is rigidly secured to a shaft 148, which shaft is journaled in bearings formed in brackets 149 rigidly secured to the main frame and extending forwardly therefrom. In the present form of the device the brackets are annular in form, as hereinafter described, and have their outer sides provided with housings 150 within which the bearings for the shaft 148 are formed. The conveyer chain is provided with a plurality of receivers 151, which, in the present instance, are in the form of grippers, each of which comprises two jaws 152 and 153, respectively. Each of these jaws is pivoted on a separate link pin of the conveyer chain 139 and the rearmost jaw 152 has a forwardly extending portion 154 which forms a support for the confection. This rear jaw has a vertical slot 155 for a purpose which will hereinafter appear. The forward jaw is normally arranged substantially parallel with the rear jaw 153 and is held in this position by means of a spring 156. This spring is mounted in a housing 157 mounted on the conveyer in front of the jaw 153 and surrounds a pin 158 carried by the jaw 153 which prevents its lateral displacement relatively thereto. When the jaw 153 is in its position nearest the jaw 154 the distance between the two jaws is slightly less than the length of the confections. Consequently, when a confection is placed between the two jaws lengthwise the jaws will exert a slight gripping pressure on the confection and hold the same against displacement. It will be further noted that as the conveyer chain passes about one of the gears the jaws will move apart or into their open positions, as indicated in Fig. 20. To make this movement of the jaws positive they may be provided with tapered projections which will engage the teeth of the gear and move the jaws relatively to the supporting link pins. As the chain again assumes a horizontal or substantially horizontal position the jaws will move into their parallel or closed positions, as indicated in Fig. 21.

Means are provided for inserting a confection and its wrapper between the jaws of the grippers, as they pass about the gear wheel 142, without interrupting the forward movement of the conveyer. To this end a support 159 is arranged to receive the wrapper in a flat condition, to receive the confection in a proper position on the wrapper and to move downwardly and forwardly to permit the confection and the wrapper to be placed between the open jaws of the gripper. This support is here shown as comprising three parallel fingers arranged in a substantially horizontal position with the outermost fingers on the opposite sides of the path of the grippers and the central finger in the plane of the slot formed in the rear jaw of the gripper, through which slot it is adapted to pass. The support is secured to the forward end of the slide bar 160 which extends at an angle thereto and is slidably mounted in an inclined guideway 161 formed in the bracket 103 and extending downwardly and forwardly. A reciprocating movement may be imparted to this slide bar in any suitable manner. In the present instance a rock arm 162 is operatively connected thereto by means of a laterally extending projection 163 which is provided with an antifriction roller 164 and extends between two lugs 165 depending from the slide bar. The rocker arm 162 is rigidly secured to a shaft 166 which is mounted in bearings 167 supported beneath the top of the frame 1. Rigidly secured to the shaft 166 are two arms 168 and 169 each having a laterally extending projection 170 and 171, respectively, arranged in the path of cams 172 and 173 mounted on the main driving shaft 4. These cams are of such a shape and are so arranged as to move the slide bar 160 in the proper direction at the proper time and at the desired speed. In this manner the support 159 is held in its uppermost and rearmost position to receive the paper and the confection and is then moved forwardly and downwardly to permit the confection and its wrapper to enter the receiver on the conveyer.

The wrapper may be placed upon the support 159 in any suitable manner, but we prefer to cut the wrappers from a web of paper which is supported in a roll beneath the top of the main frame. To this end we have provided suitable feeding and cutting mechanism to form the sheets and gripping devices to place the sheets on the support. While various mechanisms may be provided for feeding the paper we have here shown a feeding and cutting device which has proven satisfactory. This device comprises a frame consisting of two parallel side members 174 between which are mounted two shafts 175 and 176. The lower shaft 175 is journaled in the body of the side walls of the frame, while the upper shaft is journaled in upwardly extending arms 177 rigidly secured to these side walls. The shafts are preferably arranged in substantially the same vertical plane and each has mounted thereon a feed roller. The web of paper from which the wrappers are to be formed is carried from the roll, which is supported beneath the frame, upward and over a guide roller 274$^a$ supported by arms 275$^a$ forming a part of the frame members 274 and is presented to the feed rollers in a substantially horizontal plane. In the form shown each feed roller comprises a series of friction disks 178, there being, in the present instance, four of such disks on each shaft. Each disk has a series of recesses or cut away portions 179 formed therein at equal distances about the periphery thereof. Those portions of the disk lying between the recesses 179 constitute feeding projections 180 and the corresponding disks on the two shafts are mounted in substantially the same vertical planes and are so arranged that the feeding projections of the disks will grip the paper between them and feed the same forward so long as they are in engagement therewith. The projections are spaced such distances apart that one pair of projections will release the paper before the succeeding pair of projections will grip the same. Consequently, there is an interval when the paper is not acted upon by that particular pair of disks. The series of disks on each shaft are arranged alternately, i. e., the feeding projections on one disk are in the same radial planes as the recesses of the adjacent disk. Consequently, the disks of one pair will grip the paper at the instant it is released by the disks of another pair. In this manner the paper is fed forward continuously, but the points of contact of the feeding disks or rollers with the paper are constantly changing and furthermore are narrow and widely separated. By reason of this arrangement whereby the paper is alternately gripped and released by the several pairs of disks, the paper will tend of its own accord to return to its true course should it have been slightly diverted therefrom.

To accomplish the return of the paper to its normal path in a positive manner, should it be diverted therefrom, we have arranged a pair of gripping devices in a position to engage the web of paper after it passes the feeding rollers and to move the same at a slightly higher speed than it is moved by the feeding rollers, thereby exerting a pull on that portion of the web which lies between the feeding rollers and the gripping devices and tending to draw the web of paper into a straight line. These gripping devices, as here shown, comprise a roller 181 mounted on a shaft 182 journaled in the side members 174 of the frame. Arranged immediately above the roller 181 is a bar 183 arranged parallel with the roller and extending at right angles to the path of the web of paper. This bar is provided at its opposite ends with trunnions 184 and 185, which are journaled in the frame members 174. The trunnion 184 is of ordinary construction and is rigidly secured to a disk or flange 186, which, in turn, is rigidly secured to the end of the bar 183, these parts being preferably formed integral. The trunnion 185 is hollow and extends for some distance beyond the side of the frame member 174 in the form of a sleeve 187 and has slidably mounted therein a plunger 188 which is held normally in its innermost position by means of a spring 189 confined between the plunger and the closure for the end of the sleeve, which, in the present instance, comprises a screw-threaded plug 191. The bar 183 has a suitable friction member arranged along one edge thereof and adapted to engage the paper on the roller 182 and exert a gripping action thereon. This friction member, in the present instance, consists of a strip of rigid material 192, slidably mounted in the bar 183 and having a piece of leather or other suitable material inserted in the lower edge thereof, as indicated at 193. Springs 194 arranged in recesses 195 in the bar 183 bear against the inner edge of the strip 192 and tend to move the strip outwardly.

The feeding rollers and the gripping devices may be actuated in any suitable manner. In the present instance the upper shaft 176 of the feeding rollers has mounted on one end thereof a bevel gear 196 which meshes with a corresponding gear 197 secured to the upper end of a shaft 198 which extends downward through the top 2 of the main frame and has on its lower end a bevel pinion 199 meshing with a bevel pinion 200 carried by a shaft 201 arranged longitudinally to the frame and supported in bearings 202 carried by the frame. The rear end of this shaft has a bevel gear 203 meshing with a bevel gear 204 on the main driving shaft 4. The bevel gear 203 is preferably loosely connected to the shaft 201 and may be connected to and disconnected from that shaft by suitable clutch mechanism. In the present instance the bevel gear 203 is rigidly secured to a sleeve 205 into which the adjacent end of the shaft 201 projects. One end of the sleeve 205 forms a clutch member adapted to coöperate with a second clutch member 206 slidably mounted on the shaft 201 and held against rotation relatively thereto. The clutch member 206 has an annular groove 207 adapted to receive a pin 208 carried by a lever 209 which is pivotally mounted on the top 2 of the main frame at 210 and extends beyond the side of the main frame to form a handle by means of which the clutch mechanism may be actuated to control the rotation of the shaft 201, and thereby start or stop the paper feeding mechanism. The shaft 176 also has rigidly secured thereto a gear 211 which meshes with a corresponding gear 212 secured to the lower shaft 175, thereby causing the two shafts and the feeding rollers carried thereby to be rotated in opposite directions. The lower shaft 175 has a gear 213 eccentrically mounted on the end thereof opposite the gear 212 and this eccentrically mounted gear meshes with a second eccentrically mounted gear 214 carried by a shaft 215 journaled in the side members 174 and having on its opposite end a gear 216, which gear meshes with a gear 217 on the shaft 182 of the roller 181 and this gear, in turn, meshes with a gear 218 which is mounted on and rigidly secured to the sleeve-like trunnion 187 of the rotatable bar 183. The eccentric gears 213 and 214 are so arranged that their respective shafts will move slowly during a portion of their rotation and during another portion of their rotation will move at a higher rate of speed. The gears are so arranged that the speed of the shafts, and, consequently, of the roller 181 and bar 183, is increased at the time of their contact with the paper and this increased speed is greater than the speed of the feeding rollers. Consequently, the paper between the feeding rollers and the bar will be drawn taut, and, inasmuch as the bar 183 and roller 182 are at right angles to the line of movement of the paper, the tendency will be to correct any variation of the web of paper from its true course of travel, this being permitted by the narrow and widely separated points of contact between the feeding rollers or disks and the paper.

The cutting device for dividing the web of paper into sheets or wrappers may be of any suitable character and we have here shown the same as comprising a blade 219 movably mounted on the bar 183 and adapted to engage the paper in the rear of that bar while the paper is stretched taut. To this end the blade is provided with inclined slots 220 through which extend pins or bolts 221 carried by the bar 183. The trunnion 185 which supports one end of the bar 183 has an opening 222 therein to receive the adjacent end of the blade 219 and permit the same to be engaged by the spring-pressed plunger 188, which plunger tends to move the blade longitudinally to the bar 183, and, owing to the inclination of the slots 220, its movement is also a downward movement.

The movement of the blade longitudinally to the bar 183 and transversely to the paper is limited by a cam plate 223 which is secured to that frame member 174 opposite the spring-pressed plunger 188. This cam plate is in the form of a ring surrounding the trunnion 184 and has its two extremes of thickness arranged adjacent one to the other at the lowermost point of movement of the bar. The cam plate is engaged by a projection 224 extending from the adjacent end of the blade 219. As the bar 183 revolves the blade 219 will be moved laterally against the pressure of the spring-pressed plunger 188 until the bar and the blade reach the lowermost point of their movement when the projection 224 will pass off the end of the cam plate and the plunger will move the blade transversely and downwardly into engagement with the paper. At the time of the operation of the blade 219 the paper is held by the friction member 192 and roller 181 and has been drawn taut over a slot 225 formed in the roller 181 and so arranged as to be in the line of movement of the blade 219 at the time of its operation. The transverse and downward movement of the blade gives it a shearing action and this combined with the stretching of the paper over the slot 223 causes the paper to be severed with a smooth clean cut. The action of the friction member 192 and the roller 181 also serves to prevent the paper from adhering to the blade and thus having its forward movement interfered with.

The severed sheet of paper is delivered by the friction member and roller upon a supporting plate 226 having near one corner thereof a slot 227 above which the edge of the paper extends. A suitable resilient finger 228 engages the paper while it is on this plate and prevent its displacement. A pair of gripping jaws, mounted to move transversely to the machine as a whole, grip the sheet of paper while it is on the supporting plate 226 and place the same on the support 159. These gripping jaws comprise an upper jaw 230 rigidly secured to a slide bar 231 and a lower jaw 232 pivotally mounted on that slide bar. The movable jaw 232 is connected to the fixed jaw by suitable friction devices which, in the present instance, comprise a pivot pin 233, smooth throughout its length and extending through the two jaws. A spring plate 234 has one end extending about the end of the pivot pin 233 and bearing against a washer 234ª. The opposite end of the plate is curved inward toward the slide bar 231 and is held in position by a screw 234ˣ. By tightening down this screw the end of the plate which surrounds the pivot pin may be caused to exert the desired amount of pressure on the washer 234ª and on the jaw 232. In this manner sufficient friction is exerted on the movable jaw 232 to hold the same against movement by gravity. The movement of the lower jaw is accomplished by means of a projection or lug 235 extending upwardly therefrom and preferably at a point immediately above its pivotal center. As the jaws move forwardly, i. e., toward the sheet of paper on the supporting plate 226, they are in their open position and receive the edge of the paper between them. As the jaws approach the limit of their forward movement a stop, such as a finger 236 rigidly secured to one of the side members 174 of the paper feeding and cutting devices, engages the lug 235 of the movable jaw and moves that jaw about its pivotal center, causing it to grip the paper between itself and the upper jaw. The frictional resistance to the movement of the lower jaw retains it in its gripping position as the slide bar carrying the jaws is retracted. As the jaws approach their rearmost position, in which position the sheet of paper or wrapper rests upon the support 139 in the proper position to receive the confection, the lug 235 will be engaged by a stop or finger 237 carried by the bracket 238 rigidly secured to the top 2 of the main frame. This stop or finger moves the lower jaw about its pivotal center and releases the sheet of paper or wrapper therefrom. In order that the gripping action of the jaws may be increased and that a slight separating of the jaws may not release the paper the jaws are provided with resilient contact members. In the form here shown the movable jaw has mounted therein a series of soft rubber plugs, the ends of which extend beyond the face of the jaw. When the jaw is moved into its closed position the resilient members engage the paper, are compressed between the jaws and exert a strong gripping action on the paper. If the jaws should separate slightly from any cause these members will expand and still press the paper against the fixed jaw, thereby preventing it from escaping from between the jaws as would follow if the gripping faces were not yieldable. The movement of these jaws may be accomplished in any suitable manner. In the present instance the slide bar 231 is mounted in a guideway 239 formed in the bracket 238. A pitman 240 is pivotally connected at one end to the slide bar and at its other end to a crank arm 241 secured to one end of a shaft 242 journaled in horizontal bearings 243 carried by a bracket 244 mounted on the top 2 of the main frame. This shaft has secured thereto a bevel pinion 245 meshing with a corresponding pinion 246 secured to the upper end of a vertical shaft 247 which is mounted in a bearing 248 carried by the top 2 of the main frame and has its lower end extending beneath the top of the frame and provided with a bevel pinion 249 which meshes with a corresponding pinion 250 on the shaft 131. Supporting fingers 238ª and 226ª extend from the bracket 238 and the plate 226, respectively, to points near the support 159 and serve to support the outer edges of the wrapper when it is in position upon the support 159.

A confection is delivered from the chute 136 to the support 159, which, when it receives the confection, is in its elevated position, by means of a suitable ejector, the movement of which is so timed as to deliver the confections at the proper moment. This ejector preferably comprises a series of radial arms 251 carried by a hub 252 which is rigidly secured to a shaft 253 journaled in the horizontal bearing 116 carried by an upright bracket 257. This shaft is actuated by a bevel gear 254 which meshes with a corresponding gear 255 on the upper end of a vertical shaft 256. The shaft 256 is journaled in bearings 258 carried by the bracket 257 and has at its lower end a bevel gear 259 meshing with a corresponding gear 260 carried by the shaft 142. The ejector arms 251 are narrow and are provided at their outer ends with flattened portions, as indicated at 261. These ejectors are so arranged that the body portions thereof will pass through slots 262 formed in the outer walls of the pockets 98 of the carrier and the flattened portion 261 will pass through the pocket and through the chute 136, engaging the confection, forcing it past the retarding devices 138 and delivering it onto the wrapper which is carried by the support 159.

The confection, as it rests upon the wrapper on the support 159, is engaged by an inserter which moves forwardly and downwardly to insert the confection and its wrapper in the receiver carried by the conveyer while that receiver is in motion. This inserter, as here shown, comprises two parallel arms 263 which are mounted upon a shaft 264, which shaft is journaled in bearings 265 carried by the slide bar 160. The forward ends of the arms of the inserter are bent downward, as shown at 266, and are provided with laterally extending portions 267. The ends of the arms are spaced apart a distance approximately equal to the width of the receivers on the conveyer and the thickness of the lateral extensions 267 is equal, approximately, to the length of the confection. The arms of the inserter are caused to move about their pivotal center, as the slide block reciprocates, by means of rollers 268 mounted on arms 269 secured to the opposite sides of the chute 136 and arranged to engage the upper edges of the respective arms. Consequently, as the slide bar and the rear ends of the arms moves rearwardly and upwardly, the arms will pivot on the rollers 268 and the forward ends 266 of the arms will move downward. Those portions of the arms which are mounted on the shaft 264 have projections 270 extending rearwardly therefrom and adapted to be engaged by a lug or projection 271 carried by the slide bar, whereby the arms are locked in substantially horizontal positions. With the arms of the inserter in this position the downturned ends of the arms and their laterally extending portions are arranged just above and close to the upper surface of the support 159 and preferably in contact with the wrapper which rests upon the support. The downward and forward movement of the slide bar 160 carries both the support and the inserter, which now occupies a fixed relation to the support, downward and forward and these parts carry with them the confection and its wrapper. The lug 271 is mounted on a rod 272, which, in turn, is slidably mounted in bearings 273 carried by the slide bar. A spring 274 is coiled about the rod 272 and arranged between a stop thereon and one of the bearings 273 and serves to hold the rod and the lug normally in their foremost positions. When the slide bar 160 is moved into its lowermost position the end of the rod 272 which projects beyond the lower bearing 273 will engage a stop 275, which, in the present instance, is formed by the base of the bracket 137, and will force the rod and the lug 271 upwardly against the tension of the spring 274. As the slide bar 160 moves upwardly the rod moves out of engagement with the stop and the spring causes the lug 271 to bear against the outer surface of the stops 270 carried by the arms 263, and, as these arms move about their pivotal center, the lug will ride over the stops until it passes the lower edges thereof when it will be moved beneath the edges of the stops and will be held in that position by the spring, thus locking the arms in their lowermost positions. When the slide bars move downward and the rod 272 engages the stop 275 the lug 271 will be moved out of engagement with the stops 270 and the arms of the inserter released. Springs 276 are coiled about the ends of the shaft 264 and connected thereto in such a manner that they tend to move the outer ends of the arms 263 upward. Consequently, the instant the lug 271 is moved out of engagement with the stop 270, this spring will elevate the forward ends of the arms. The springs on the shaft 264 are preferably inclosed in housings 277 which prevent chips or particles of candy or other matter from coming in contact therewith.

The movement of the inserter is very rapid and it is desirable that some means should be provided to prevent the confection being displaced when the inserter and support move downward. To this end we have provided the inserter with retaining devices adapted to engage the confection and press the same against the support. These retaining devices, as here shown, comprise two arms 278 pivoted to the inner sides of the respective arms 263 of the inserter and having their forward ends turned downward parallel with the downturned ends of the inserter arms and provided with contact faces 279. Springs 280 connected at one end to the retainer arms and at the other end to the inserter arms tend normally to move the retainer arms downward relative to the inserter arms. The rear ends of the retainer arms are turned downward and have lateral projections 279× adapted to be engaged by inclined stops 279ª secured to the edges of the chute 136 during the rearward portion of the movement of the inserter arms. When thus engaged the forward ends of the retainer arms and their contact faces 279 are moved into their elevated positions. The rear ends of the retainer arms are so arranged with relation to the stops 279ª that the contact faces of the retainers are elevated when the confection is placed on the support by the ejector. After the confection is in position and at the beginning of the downward movement of the inserter and the support the retainer arms move out of engagement with the stops and the springs 280 move the same downward and cause the contact faces 279 to engage the confection and clamp the same against the support 159, thereby holding it firmly in place and preventing the displacement thereof during the quick downward movement of the inserter and support, by means of which movement the confection and its wrapper are placed between the jaws 151 of the receiver on the conveyer. Spring pressed plungers 268× are mounted in the laterally extending portions 267 of the arms 263 and will serve to hold the wrapper in position should the arms 263 release their hold on the same owing to play between the several parts of the mechanism or from any other cause.

In Figs. 34 to 36 we have illustrated three successive positions of the mechanism by which the confection and its wrapper are placed in the receiver or gripper of the conveyer. In Fig. 34 the parts are in their initial positions. The slide bar 160 and support 159 are in their lowermost positions, the inserter is in its elevated position and the confection has entered the chute and is about to be engaged by the ejector. In Fig. 35 the slide bar has been moved rearward and upward, elevating the support and depressing the inserter, the wrapper is in place upon the support, the laterally extending portions of the inserter are in engagement with the wrapper and are holding the same on the support and the confection has just been placed between the two arms of the inserter by the ejector. Both the support and the inserter are elevated above the path of the receiver on the conveyer and this receiver occupies a position immediately beneath the support with its jaws in their open position. It will be noted that the inserter arms have moved forward slightly from their rearmost position and that the retaining arms have been released by the rollers 279× and the contact pieces of the retainers are in engagement with the confection and are holding the same in position on the support. The continued movement of the mechanism causes the several parts to assume the position shown in Fig. 36. Here the support and the inserter have both moved forward and downward, inserting the confection and its wrapper between the jaws of the receiver and the receiver itself has moved forward and the jaws have assumed their closed positions, thus gripping the confection and the wrapper and retaining the same in position upon the conveyer. The further movement of the parts carries the receiver beyond the support and releases the inserter arms, thus permitting the parts to again assume the position shown in Fig. 34. This cycle of operations is performed with great rapidity and there is no interruption to the movement of the conveyer, the support and receiver having their movements so timed as to enable them to perform their functions while the conveyer is in motion. It will be noted that the confection is delivered from the chute 136 onto the wrapper in a position with its greatest length parallel to the length of the conveyer and that when the confection and the wrapper are inserted in the receiver the front and rear portions of the wrapper are folded across the ends of the confection.

As the conveyer moves forward the wrapper which has been partially folded about the confection when it was inserted in the receiver is presented, first, to folding devices which complete the folding of the wrapper about the confection, and then to twisting devices which twist the ends of the wrapper. The folding devices consist of two parts, one of which is fixed against movement and the other of which moves relative to the fixed part and to the wrapper. The fixed member of the folding devices preferably comprises a rearwardly extending plate 281 which is supported from a bracket 282, which, in turn, is secured to a transverse bar 283 supported at its ends on the annular brackets 149. This plate extends above the conveyer and is arranged at a height above the conveyer just sufficient to permit the jaws of the receivers to pass beneath the same. This plate engages the forward portion of the wrapper and folds the same over the confection as the latter moves forward. The movable member of the folding device is indicated at 284 and comprises a plate arranged transversely to the conveyer and preferably having its ends curved downwardly. This plate is secured to one end of a bifurcated arm 285, the opposite end of which is rigidly secured to the rockshaft 121. The movement of this rockshaft is so timed that the plate 284 will move downward and engage the rear portion of the wrapper just as the receiver passes beneath the fixed plate 281. In this manner the rear portion of the wrapper is folded beneath the front portion thereof. A curved guard 286 extends forwardly from the rear edge of the fixed plate 281 and is supported by the bracket 282. This guard is curved to correspond to the curvature of the gear 147, about which the conveyer passes, and is spaced a sufficient distance from that gear to permit the jaws of the receivers to pass beneath the same, but is arranged so close to these jaws as to hold the wrappers in their folded positions until they are gripped by the twisting devices and then to retain the confection within the jaws during the twisting operation and after the jaws have moved into their open positions.

The twisting devices which grasp and twist the ends of the folded wrapper may be of any suitable character and may be operated in any suitable manner. In the present instance we have provided two series of grippers arranged on opposite sides of the conveyer and adapted to coöperate to simultaneously twist both ends of the wrapper. To this end the twisters of the two series are arranged in pairs and the twisters of each pair are adapted to move in paths substantially parallel with the path of the receivers carried by the conveyer and at a speed substantially equal to the speed of these receivers. Each twister comprises a pair of jaws 287 pivotally connected at one end to the adjacent end of a shaft 288. This shaft extends transversely to the length of the conveyer and substantially parallel with the shaft 148 which carries the gear 147. The shaft 148 is rotated by the chain 139 which constitutes the conveyer. The shaft 288 of the twister is journaled in bearings 289 formed at the outer ends of arms 290 which are rigidly secured at their inner ends to a hub 291, which, in turn, is rigidly secured to and rotates with the shaft 148. The shaft 288 is slidably and rotatably mounted in the bearings 289 and means are provided whereby the longitudinal movement of the shaft will open and close the twister jaws 287. For this purpose we have mounted about the shaft 288 a sleeve 292 which is connected to the bearing 289 by clips 301 which permit the sleeve to rotate with the shaft and the twisting jaws and hold the same against longitudinal movement relative to the bearing 289. This sleeve has two inwardly projecting fingers 293, one of which is arranged on each side of the shaft. The twisting jaws 287 are connected to the fingers 293 by links 294 which are pivotally connected at one end to the respective jaws and have in their opposite end slots 295 through which extend pins 296 carried by the arms 293. A slotted bar 297 extends transversely to the gripping jaws and is connected thereto by means of pins 298 secured to the respective jaws and extending through the slot in the bar. These pins extend some distance beyond the bar and form stops against which bear the inner ends of springs 299 which are coiled about the opposite end portions of the bar 297. The outer ends of these springs bear against stops 300 rigidly secured to the ends of the bar. These springs exert a constant inward pressure upon the pins 298, and, consequently, upon the jaws and tend to move the jaws one toward the other. We have, in the present instance, shown two bars, each provided with springs 299 and arranged one on each side of the pair of jaws, thus preventing any twisting or lateral displacement of the jaws. It will be apparent that with this construction the inward movement of the shaft 288 will move the pivotal center of the jaws relative to their points of connection to the links 294, and, consequently, these links will move the jaws into their open positions, and, as the inward movement of the shaft continues, will move the pins 298, by means of which the spring pressure is exerted upon the jaws, past the plane of the pivotal center of the jaws and the spring will then move the jaws one toward the other, causing them to assume a completely open position and retaining them in that position until the shaft has been retracted or moved outwardly a distance sufficient to again move the pins 298 past the pivotal center of the jaws, thereby permitting the springs to move the jaws into their closed positions. The twisting jaws are continually rotated to cause the same to twist the ends of the wrapper after they have closed upon it. Longitudinal and rotatory movement are both imparted to the shaft 288 by a pinion 302 which is rigidly secured to the shaft between the bearings 289 and adapted to travel over an internal gear 303 carried by the annular bracket 149. This internal gear is arranged at an inclination to a vertical plane extending through the bracket 149 and extends from one side of the bracket to the other and then back to the point from which it starts, thereby causing the pinion and the shaft to which it is secured to make one complete reciprocation for each revolution of the twister shaft about the main shaft 148. The teeth of the internal gear 303 are preferably formed with their outer ends flush with the surface of the bracket and, in effect, constitute integral parts of the bracket spaced apart by recesses formed in the bracket. This gear may be constructed in any suitable manner, but, in the present instance, we have shown the same with the teeth cast integral with the body of the bracket. The end walls of the spaces between the teeth converge toward the base of the teeth, as shown at 304, and the teeth of the pinion 302 taper outwardly. Consequently, as the pinion travels over the gear the beveled edges of the teeth will engage the inclined end walls of the space between the teeth of the gear and will move the pinion and the shaft, to which it is secured, transversely to the bracket 149 and toward or away from the conveyer and will also rotate the pinion and the shaft.

We have, in the present instance, shown the machine as provided with four pairs of twisters and have so arranged these twisters and timed their movement that one pair of twisters will be in alinement with each of the receivers 151 as these receivers pass the folding devices. The inclined internal gear is so arranged as to cause the jaws of the twisters to close upon the ends of the wrapper when they have reached a position just beyond the folding devices and to remain closed on the wrapper until they have traveled approximately through a quarter of a revolution and during which time they have rotated about their axes a sufficient number of times to properly twist the ends of the wrapper. The jaws of the receivers 151 will open as they pass about the gear 147, but the guard 286 will prevent the displacement of the confection and will retain the same in the receiver until the twisting is completed. When the twister has rotated a sufficient number of times to twist the ends of the wrapper, the twister jaws will open and permit the confection to drop from the open jaws of the receiver. Any suitable means may be provided to receive the wrapped confection, either a suitable receptacle or a conveyer to carry the same to the desired point.

The operation of the machine as a whole will be readily understood from the description of the several mechanisms comprising the machine and coöperating to form and wrap candy. It will be apparent that both the construction and the operation of the machine are very simple and are such as to enable it to be operated at a high rate of speed, the machine being capable under working conditions of wrapping from one hundred and twenty to one hundred and fifty confections per minute. This high speed results naturally from the arrangement of parts by which the confection is moved always in a forward direction; by which the confection and its wrapper are placed on the conveyer while the latter is in motion; and by which the folding of the wrapper and the twisting of the ends thereof are accomplished while the conveyer is in motion, the conveyer itself having continuous motion in one direction. The simplicity of the machine and the arrangement of its parts are such that it can be readily operated by the labor ordinarily employed in candy factories, this labor usually being unskilled in mechanics. It will be noted in this connection that the arrangement of the parts are such that the confection is at all times within sight of the operator, enabling him to instantly detect any disarrangement or misplacement of the confection or its wrapper; and further, that the confection is at all times readily accessible. Should such disarrangement or displacement occur the confection and its wrapper can be readily removed from the machine without removing or loosening any parts thereof. It will further be noted, however, that the mechanism is so operated and so timed as to be positive in its operation and to render the liability of a disarrangement or misplacement of the confection improbable. It will further be noted that the moving parts are so arranged with relation one to the other and to the top of the main frame that the chips or particles of candy flying from the cutter will not accumulate thereon in such quantities as to interfere with the operation thereof, this resulting largely from the arrangement of these parts above the main frame and in such positions that the chips or fragments will not lodge on the moving parts but will drop to the main frame.

While we have shown and described herein one form of machine embodying our invention it will be understood that the machine so shown and described is for purposes of illustration only and that the construction of the several mechanisms comprising the machine may be widely varied without departing from my invention. For example, the wrapper support and its coöperating inserter are described as mounted on an inclined slide bar, but, obviously, any suitable carriage or carriages may be provided for these parts which will cause them to move toward and in the direction of movement of the conveyer at the proper intervals, and the construction and arrangement of the conveyer itself is optional and may be greatly varied. We, therefore, wish it to be understood that we do not desire to be limited to the details of construction shown and described, for obvious modifications will occur to a person skilled in the art, and we further wish it to be understood that, although we have shown and described the invention as embodied in a confection forming and wrapping machine, it is capable of embodiment, either in whole or in part, in wrapping machines of various kinds.

Having thus fully described our invention, what we claim as new and desire to secure by Letters Patent, is:—

1. A machine of the character described comprising conveying mechanism arranged to move continuously in one direction and adapted to convey a confection and its wrapper, and twisting devices arranged on opposite sides of said conveying mechanism to act on said wrapper and twist both ends thereof while said conveyer is in motion.

2. A machine of the character described comprising conveying mechanism arranged to move continuously in one direction and adapted to convey a confection and its wrapper, and devices arranged to act on said wrapper while said conveying mechanism is in motion to fold it about said confection with its ends projecting on both sides of said conveyer and to twist both ends of said wrapper.

3. A machine of the character described comprising conveying mechanism arranged to move continuously in one direction and adapted to convey a confection and its wrapper, twisting devices arranged on opposite sides of said conveyer to act on said wrapper and twist both ends thereof while said conveyer is in motion, and devices carried by said conveyer to hold said confection against movement relative thereto during the operation of said twisting devices.

4. A machine of the character described comprising a conveyer arranged to move continuously in one direction, means to place a confection and its wrapper on said conveyer while the latter is in motion, and twisting devices arranged on opposite sides of said conveyer to engage and twist the ends of said wrapper while said conveyer is in motion.

5. A machine of the character described comprising a conveyer arranged to move continuously in one direction, means to place a confection and its wrapper on said conveyer while the latter is in motion, and twisting devices arranged on opposite sides of said conveyer, traveling in paths substantially parallel with the path of said conveyer and adapted to engage and twist the ends of said wrapper while said conveyer is in motion.

6. A machine of the character described comprising a conveyer, and a device to receive and support a confection, said device as a whole being movable toward and in the same direction as said conveyer to place said confection on said conveyer while the latter is in motion.

7. A machine of the character described comprising a conveyer, and a device to receive and support a confection, said device having reciprocatory movement toward and in the same direction as said conveyer and having positively actuated means to place said confection on said conveyer while the latter is in motion.

8. A machine of the character described comprising a conveyer, and a device to support a confection and its wrapper and movable toward and in the same direction as said conveyer to place said confection and its wrapper on said conveyer while the latter is in motion.

9. A machine of the character described comprising a conveyer, and a device to support a confection and its wrapper, said device being movable toward and in the same direction as said conveyer and having positively actuated means to place said confection and its wrapper on said conveyer while the latter is in motion.

10. A machine of the character described comprising a conveyer, and a device to support a confection and its wrapper, said device being movable toward and in the same direction as said conveyer and having positively actuated means to simultaneously place said confection and its wrapper on said conveyer while the latter is in motion.

11. A machine of the character described, comprising a conveyer, means to support a confection and its wrapper, and movable in the same direction as said conveyer to place said confection and its wrapper on said conveyer while the latter is in motion, and folding devices supported independently of said conveyer and arranged to fold said wrapper about said confection while said conveyer is in motion.

12. A machine of the character described comprising a conveyer, a device movable in the same direction as said conveyer and having positively actuated means to place a confection and its wrapper on said conveyer while the latter is in motion, folding devices, twisting devices on opposite sides of said conveyer, both said folding devices and said twisting devices being arranged to operate on said wrapper while said conveyer is in motion.

13. A machine of the character described comprising a continuously movable conveyer having a receiver, and a reciprocatory device to receive a confection at a point remote from said conveyer and to support said confection, said device being movable toward and in the same direction as said conveyer to place said confection in the receiver while said conveyer is in motion.

14. A machine of the character described comprising a conveyer having receivers arranged at intervals thereon, and a device to receive a confection and its wrapper at a point remote from said conveyer and having movement toward and in the same direction as said conveyer to place said confection and said wrapper in one of said receivers.

15. In a machine of the character described, a conveyer comprising an endless chain formed of links connected one to the other by link pins, toothed wheels about which said chain passes, and a gripper mounted on said conveyer and comprising jaws each mounted on a different link pin and having a projection to engage the teeth of said wheels, whereby when that portion of said conveyer carrying said gripper passes about one of said wheels, the jaws of said gripper will be moved into their open positions, and when that portion of said conveyer carrying said gripper extends in a substantially straight line the jaws of said gripper will be in their closed positions.

16. In a machine of the character described, an endless conveyer comprising a series of pivotally connected links, wheels about which said conveyer passes, and grippers mounted on said conveyer and each comprising two jaws, one of said jaws being rigidly connected to one of said links and the other jaw being pivotally connected to said conveyer near the link carrying the fixed jaw, whereby when that portion of the conveyer carrying the gripper passes about one of said wheels the jaws will be moved in their open position and when said portion of said conveyer extends in a substantially straight line the jaws will be in their closed positions, and a spring tending at all times to move said pivoted jaw toward said fixed jaw to cause said jaws to have a resilient gripping action when in their closed positions.

17. In a machine of the character described, a wheel, a conveyer extending about said wheel comprising a series of links, a gripper mounted on said conveyer and comprising two jaws mounted on different links, one of said jaws being movable toward and away from the other independently of the movement of the links, and a spring tending at all times to move the movable jaw toward the other of said jaws and to permit said movable jaw to yield to accommodate the gripper to articles of different sizes.

18. In a machine of the character described, an endless conveyer comprising a series of links, wheels about which said conveyer passes, a gripper carried by said conveyer and comprising two jaws mounted on different links, whereby said jaws will be moved apart as said gripper passes about one of said wheels, and means arranged above one of said wheels to place a confection in said gripper while the links carrying said jaws are on said wheel and said jaws are in their open positions.

19. In a machine of the character described, the combination, with a conveyer arranged to move continuously in one direction, a receiver carried by said conveyer, and means for inserting a confection and its wrapper in said receiver, thereby folding the front and rear portions of said wrapper across the front and rear ends of said confection, of folding devices comprising a fixed plate arranged above said conveyer and adapted to engage the front portion of said wrapper and fold the same rearwardly, and a movable plate also arranged above said conveyer and adapted to engage the rear portion of said wrapper and fold the same forwardly beneath the partially folded front portion thereof.

20. In a machine of the character described, the combination, with a conveyer arranged to move continuously in one direction, and means for retaining a confection and its wrapper on said conveyer, of twisting devices also arranged to move continuously in one direction and rotatable to twist the ends of said wrapper.

21. In a machine of the character described, the combination, with an endless conveyer, a wheel supporting said conveyer and about which it moves, and means for retaining a confection and its wrapper on said conveyer, of twisting devices arranged on opposite sides of said conveyer and mounted to revolve about the axis of said wheel and to rotate about axes extending through the twisters.

22. In a machine of the character described, the combination, with an endless conveyer, a wheel about which said conveyer passes, a shaft for said wheel, and means for retaining a confection and its wrapper on said conveyer, of arms secured to said shaft on opposite sides of said wheel and adapted to rotate about the axis of said shaft, a twisting device carried by each of said arms, and means for rotating each of said twisting devices about an axis extending through the same and extending parallel with said shaft.

23. In a machine of the character described, the combination, with an endless conveyer, a wheel about which said conveyer passes, a shaft for said wheel, and means for retaining a confection and its wrapper on said conveyer, of a hub mounted on said shaft on each side of said wheel, a plurality of arms carried by each of said hubs, twister shafts journaled in the outer ends of said arms, twister jaws carried by each of said twister shafts, and means for rotating said twister shafts.

24. In a machine of the character described, the combination, with an endless conveyer, a wheel about which said conveyer passes, a shaft for said wheel, and means for retaining a confection and its wrapper on said conveyer, of an arm carried by said wheel shaft on each side of said wheel, a twister shaft rotatably mounted on each of said arms, twister jaws carried by said twister shaft, and means for rotating said twister shaft about its own axis while it is revolving about said wheel shaft.

25. In a machine of the character described, the combination, with an endless conveyer, a wheel about which said conveyer passes, a shaft for said wheel, and means for retaining a confection and its wrapper on said conveyer, of an arm secured to said wheel shaft on each side of said wheel, a twister shaft mounted on each of said arms, twister jaws mounted on said twister shaft, and means for imparting both a rotary and a reciprocatory movement to said twister shaft while the same is revolving about said wheel shaft.

26. In a machine of the character described, the combination, with an endless conveyer, a wheel about which said conveyer passes, a shaft for said wheel, and means for retaining a confection and its wrapper on said conveyer, of an arm secured to said wheel shaft on each side of said wheel, a twister shaft mounted on each of said arms, twister jaws mounted on said twister shaft, means for imparting both a rotatory and a reciprocatory movement to said twister shaft while the same is revolving about said wheel shaft, and means actuated by the reciprocatory movement of said twister shaft to move said twister jaws into their open and closed positions.

27. In a machine of the character described, the combination, with an endless conveyer, a wheel about which said conveyer passes, a shaft for said wheel, and means for retaining a confection and its wrapper on said conveyer, of an arm carried by said shaft on each side of said wheel, a twister shaft rotatably and slidably mounted on each of said arms, twister jaws carried by each of said twister shafts, means controlled by the sliding movement of said shaft for actuating said jaws, and means actuated by the movement of said arms and said twister shaft about said wheel shaft to impart both a rotary and a sliding movement to said twister shaft.

28. In a machine of the character described, the combination, with an endless conveyer, a wheel about which said conveyer passes, a shaft for said wheel, and means for retaining a confection and its wrapper on said conveyer, of an arm carried by said shaft on each side of said wheel, a twister shaft rotatably and slidably mounted on each of said arms, twister jaws carried by each of said twister shafts, means controlled by the sliding movement of said shaft for actuating said jaws, an annular bracket extending about said wheel shaft and having a series of recesses formed in the inner surface thereof and extending from one side of said bracket to the other side thereof, the spaces between said recesses forming teeth, and a pinion mounted on said twister shaft and adapted to enter said recesses.

29. In a machine of the character described, the combination, with an endless conveyer, a wheel about which said conveyer passes, a shaft for said wheel, and means for retaining a confection and its wrapper on said conveyer, of an arm carried by said shaft on each side of said wheel, a twister shaft rotatably and slidably mounted on each of side arms, twister jaws carried by each of said twister shafts, means controlled by the sliding movement of said shaft for actuating said jaws, an annular bracket extending about said wheel shaft and having a series of recesses formed in the inner surface thereof and extending from one side of said bracket to the other side thereof, the spaces between said recesses forming teeth, and a pinion mounted on said twister shaft and adapted to enter said recesses.

30. In a machine of the character described, the combination, with an endless conveyer, a wheel about which said conveyer passes, a shaft for said wheel, and means for retaining a confection and its wrapper on said conveyer, of an arm carried by said shaft on each side of said wheel, a twister shaft rotatably and slidably mounted on each of said arms, twister jaws carried by each of said twister shafts, means controlled by the sliding movement of said shaft for actuating said jaws, an annular bracket extending about said wheel shaft and having a series of recesses formed in the inner face thereof and extending completely about the same, said series of recesses being inclined to a vertical plane extending through said annular bracket, said recesses having their end walls inclined, and a pinion mounted on said twister shaft and having its teeth beveled and adapted to enter said recesses, whereby, as said twister shaft revolves about said wheel shaft, said pinion will travel over said inclined series of recesses and will impart both a rotatory movement and a reciprocatory movement to said twister shaft.

31. In a machine of the character described, the combination, with a flexible conveyer, means for retaining a confection and its wrapper on said conveyer, and a wheel about which said conveyer passes, of a twisting device arranged on each side of said conveyer, a support for each of said twisting devices, each of said supports being adapted to revolve about an axis arranged in alinement with the axis of said wheel, and means controlled by the movement of said support for actuating said twisting devices to cause the same to engage and twist the ends of the wrapper carried by said conveyer.

32. In a machine of the character described, the combination, with a main frame, two annular brackets secured to one side of said main frame, a shaft rotatably mounted within said brackets, a wheel carried by said shaft, a conveyer extending about said wheel, and means for retaining a confection and its wrapper on said conveyer, of a plurality of twisting devices arranged on each side of said conveyer and adapted to revolve about said shaft, and means controlled by the revolution of said twisting devices about said shaft to cause said devices to engage and twist the ends of the wrappers carried by said conveyer.

33. In a machine of the character described, the combination, with a main frame, two annular brackets secured to one side of said main frame, a shaft rotatably mounted within said brackets, a wheel carried by said shaft, a conveyer extending about said wheel, and means for retaining a confection and its wrapper on said conveyer, of a plurality of twisting devices arranged on each side of said conveyer and adapted to revolve about said shaft, means controlled by the revolution of said twisting devices about said shaft to cause said devices to engage and twist the ends of the wrappers carried by said conveyer, and housings inclosing the outer side of each of said annular brackets.

34. In a machine of the character described, a twisting device comprising a shaft having both a rotatory movement and a reciprocatory movement, twister jaws pivotally connected at one end to said shaft, means actuated by the longitudinal movement of said shaft for moving said twister jaws into their open or closed positions, and springs connected to said jaws and tending to move the same one toward the other.

35. In a machine of the character described, a twisting device comprising a shaft, twister jaws pivotally connected to one end of said shaft, a spring-actuated device for moving said jaws one toward the other, and means for moving said jaws about their pivotal center to carry said spring-actuated device from one side of said pivotal center to the other side thereof, thus causing said spring-actuated device to retain said jaws in either their open or their closed positions.

36. In a machine of the character described, a shaft, a bearing for said shaft, means for imparting both a reciprocatory movement and a rotatory movement to said shaft, twister jaws pivotally connected to one end of said shaft, a sleeve surrounding said shaft, rotatably connected to said bearing and held against longitudinal movement relative thereto, links pivotally connected at one end to the respective jaws and having slots in their opposite ends, pins carried by said sleeve and extending through the respective slots, and a spring-actuated device connected to said jaws and adapted to move the same one toward the other.

37. In a machine of the character described, a shaft, a bearing for said shaft, means for imparting both a reciprocatory movement and a rotatory movement to said shaft, twister jaws pivotally connected to one end of said shaft, a sleeve surrounding said shaft and rotatably connected to said bearing and held against longitudinal movement relative thereto, links pivotally connected at one end to the respective jaws and having slots in their opposite ends, pins carried by said sleeve and extending through the respective slots, a pin carried by each of said jaws, a slotted bar mounted on said pins, stops carried by said bar beyond each of said pins, and springs coiled about said bar between said stops and said pins.

38. A machine of the character described comprising a carrier, a conveyer, means for moving said conveyer continuously in one direction, mechanism interposed between said carrier and said conveyer to place a confection and its wrapper on said conveyer while the latter is in motion, and twisting devices arranged to engage the ends of the wrapper and rotatable to twist said ends while the wrapper and confection are on said conveyer.

39. A machine of the character described comprising a carrier, a conveyer, means to support a wrapper adjacent to and out of engagement with said conveyer, a device to receive a confection from said carrier and deliver it on said wrapper, a receiver carried by said conveyer and adapted to be moved in a position adjacent to said wrapper-supporting means, and means to insert said confection and its wrapper in said receiver.

40. A machine of the character described comprising a carrier, a conveyer, a device to support a wrapper above and out of engagement with said conveyer, a chute arranged to receive a confection from said carrier and terminating above said supporting device, whereby said confection is delivered on said wrapper while the latter is out of engagement with said conveyer, a series of receivers carried by said conveyer and adapted to be moved successively into a position beneath said wrapper-supporting device, an inserter to place said wrapper and said confection in that receiver which is adjacent to said supporting device and means to move said wrapper support toward said receiver.

41. A machine of the character described comprising a carrier, a conveyer, a chute arranged to receive a confection from said carrier and terminating near said conveyer, a movable device to support a wrapper in a position to receive the confection from said chute, retarding devices for retaining the confection in the chute, an ejector for ejecting the confection from the chute and delivering the same onto the wrapper, an inserter, and means for actuating said wrapper-supporting device and said inserter to place said confection and said wrapper on said conveyer.

42. A machine of the character described comprising a conveyer, means for moving said conveyer continuously in one direction, a receiver carried by said conveyer, a device to support a wrapper adjacent to and out of engagement with said conveyer, means for delivering a confection to said supporting device when said wrapper is in position thereon, and an inserter adapted to place said confection and said wrapper in the receiver on said conveyer while said conveyer is in motion, said wrapper support being movable toward and away from said conveyer.

43. A machine of the character described comprising a conveyer, means for moving said conveyer continuously in one direction, a receiver carried by said conveyer, a support for a wrapper arranged above the path of said receiver, means for delivering a confection to said support when the wrapper is in position thereon, an inserter arranged above said confection and said wrapper, and means for moving said support and said inserter downwardly and forwardly to insert said confection and said wrapper in said receiver while the latter is in motion.

44. A machine of the character described comprising a conveyer, means for moving said conveyer continuously in one direction, a receiver carried by said conveyer, a support for a wrapper arranged above the path of said receiver, means for delivering a confection to said support when the wrapper is in position thereon, an inserter adapted to engage said wrapper on opposite sides of the confection, and means for moving said support and said inserter downwardly and forwardly to insert the confection and its wrapper in said receiver.

45. A machine of the character described comprising a conveyer, means for moving said conveyer continuously in one direction, a receiver carried by said conveyer, a support for a wrapper arranged above the path of said receiver, means for delivering a confection to said support when the wrapper is in position thereon, an inserter having lateral portions adapted to engage the wrapper on opposite sides of the confection, retaining devices carried by said inserter and adapted to engage the confection, and means for actuating said inserter and said support to place said confection and its wrapper in said receiver.

46. A machine of the character described comprising a conveyer, means for moving said conveyer continuously in one direction, a receiver carried by said conveyer, a support for a wrapper arranged above the path of said receiver, means for delivering a confection to said support when the wrapper is in position thereon, an inserter having lateral portions adapted to engage said wrapper on opposite sides of said confection, means for moving said inserter and said support downwardly and forwardly to place the confection and its wrapper in said receiver, a spring-pressed retaining device carried by said inserter and adapted to engage said confection, and means for holding said retaining device in its inoperative position when said inserter is in its elevated position, said means being arranged to release said retaining devices when said inserter begins its downward movement.

47. A machine of the character described comprising a conveyer, means for moving said conveyer continuously in one direction, a receiver carried by said conveyer, a support for a wrapper arranged above the path of said conveyer, means for delivering a confection to said support when the wrapper is in position thereon, an inserter having lateral portions adapted to engage the wrapper on the opposite sides of the confection, means for moving the inserter and the support downwardly and forwardly to insert the confection and its wrapper in said receiver while the latter is in motion, a retaining device comprising an arm pivotally mounted on said inserter and having its contact face adapted to engage said confection, a spring tending to move said contact face toward said confection, and a fixed part carried by said machine and adapted to engage the arm of said retaining device to hold the same in its inoperative position against the tension of said spring when said inserter is in its elevated position and to release said arm when said inserter moves downwardly.

48. A machine of the character described comprising a conveyer, an inclined slideway arranged near said conveyer, a slide bar mounted in said slideway, a support for a wrapper carried by said slide bar, means for placing a confection on said support when the wrapper is in position thereon, means for actuating said slide bar to move said support downwardly and forwardly, and means coöperating with said support to place said confection and its wrapper on said conveyer.

49. A machine of the character described comprising a conveyer, an inclined slideway arranged near said conveyer, a slide bar mounted in said slideway, a support for a wrapper carried by said slide bar, means for placing a confection on said support when the wrapper is in position thereon, means for actuating said slide bar to move said support downwardly and forwardly, and an inserter also mounted on said slide bar and coöperating with said support to place said confection and said wrapper on said conveyer.

50. A machine of the character described comprising a conveyer, a receiver carried by said conveyer comprising a slotted jaw, a support comprising a plurality of fingers, one of which is arranged to enter the slot in said receiver, a slide bar carrying said support, an upwardly and rearwardly inclined slideway for said slide bar, means for placing a wrapper on said support, means for delivering a confection onto said wrapper, an inserter arranged to coöperate with said support, and means for moving said inserter and said support downwardly and forwardly to insert the confection and its wrapper in said receiver.

51. A machine of the character described comprising a conveyer, a receiver carried by said conveyer comprising a slotted jaw, a support comprising a plurality of fingers, one of which is arranged to enter the slot in said receiver, a slide bar carrying said support, an upwardly and rearwardly inclined slideway for said slide bar, means for placing a wrapper on said support, means for delivering a confection onto said wrapper, an inserter mounted on said slide bar and arranged to coöperate with said support, and means for actuating said slide bar to move said support and said inserter downwardly and forwardly to place the confection and its wrapper in said receiver.

52. A machine of the character described comprising a conveyer, a support for a wrapper arranged near said conveyer, means for placing a confection on said wrapper, an inserter arranged above said support and adapted to engage said wrapper when the confection is in position thereon, means for moving said support and said inserter downwardly and forwardly to place said confection and its wrapper on said conveyer, and means for locking said inserter in engagement with said wrapper during said downward and forward movement thereof.

53. A machine of the character described comprising a conveyer, a support for a wrapper arranged near said conveyer, means for placing a confection on said wrapper, an inserter arranged above said support and adapted to engage said wrapper when the confection is in position thereon, means for moving said support and said inserter downwardly and forwardly to place said confection and its wrapper on said conveyer, a locking device for retaining said inserter in operative relation with said support during their downward and forward movement, and means for disengaging the locking device from the inserter when these parts have reached their lowermost positions.

54. A machine of the character described comprising a conveyer, a support for a wrapper arranged near said conveyer, means for placing a confection on said wrapper, an inserter arranged above said support and adapted to engage said wrapper when the confection is in position thereon, means for moving said support and said inserter downwardly and forwardly to place said confection and its wrapper on said conveyer, a locking device for retaining said inserter in operative relation with said support during their downward and forward movement, means for disengaging the locking device from the inserter when these parts have reached their lowermost positions, and means for moving said inserter away from said support when said locking device is so disengaged.

55. A machine of the character described comprising a conveyer, an inclined slideway arranged near said conveyer, a slide bar mounted thereon, means for actuating said slide bar, a support for a wrapper carried by said slide bar, means for placing a wrapper on said support, means for delivering a confection onto said wrapper, an inserter pivotally mounted on said slide bar, means for moving said inserter into operative relation with said support as said slide bar approaches its elevated position, means for locking the inserter in its operative relation to said support during the downward and forward movement of said slide bar, and means for releasing said inserter.

56. A machine of the character described comprising a conveyer, an inclined slideway arranged near said conveyer, a slide bar mounted thereon, means for actuating said slide bar, a support for a wrapper carried by said slide bar, means for placing a wrapper on said support, means for delivering a confection onto said wrapper, an inserter pivotally mounted on said slide bar, means for moving said inserter into operative relation with said support as said slide bar approaches its elevated position, a stop carried by said inserter, a lug movably mounted on said slide bar, a spring arranged to move said lug toward said inserter and to cause the same to engage said stop when said inserter is in its operative relation to said support, and a rod operatively connected to said stop and adapted to engage a stop carried by a fixed part of said machine and move said lug out of engagement with the stop on said inserter as said inserter and said support approach their lowermost positions.

57. A machine of the character described comprising a conveyer, a downwardly and forwardly inclined bar slidably mounted near said conveyer, a support for a wrapper carried by said slide bar, a shaft mounted on said slide bar, an inserter comprising two substantially parallel arms pivotally mounted on said shaft and having their free ends arranged to coöperate with said support, a spring coiled about each end of said shaft and adapted to actuate said inserter to move the same into its inoperative position, a fixed part arranged to engage said inserter arms and move the same into their operative relation to said support against the tension of said spring, a locking device to retain said inserter arms in their operative relation to said support during the forward and downward movement of said slide bar, and means for releasing said locking device from said inserter arms as said slide bar approaches the lower limit of its movement.

58. A machine of the character described comprising a conveyer, a downwardly and forwardly inclined bar slidably mounted near said conveyer, a support for a wrapper carried by said slide bar, a shaft mounted on said slide bar, an inserter comprising two substantially parallel arms pivotally mounted on said shaft and having their free ends arranged to coöperate with said support, springs coiled about said shaft on opposite sides of said inserter arms and operatively connected to said arms to move the same away from said support, a housing inclosing each end of said shaft and its spring, a fixed part arranged to engage said inserter arms and move the same into their operative relation to said support against the tension of said spring, a locking device to retain said inserter arms in their operative relation to said support during the forward and downward movement of said slide bar, and means for releasing said locking device from said inserter arms as said slide bar approaches the lower limit of its movement.

59. A machine of the character described comprising confection-forming devices, a carrier arranged to receive the confections from said forming devices, a movable wrapper support, a chute arranged to convey a confection from said carrier to the wrapper on said support, a conveyer, and means coöperating with said wrapper-support to place the confection and the wrapper on said conveyer.

60. A machine of the character described comprising confection-forming devices, a carrier arranged to receive the confections from said forming devices, a movable wrapper support, a chute arranged to convey a confection from said carrier to the wrapper on said support, a continuously moving conveyer, and means coöperating with said support to place the confection and its wrapper on said conveyer while the latter is in motion.

61. A machine of the character described comprising a conveyer, a device to receive and support a confection, said device being movable in the same direction as said conveyer to place said confection on said conveyer while the latter is in motion, and means moving with said supporting device to retain said confection in position thereon during such movement.

62. A machine of the character described comprising a conveyer, a device to support a confection and its wrapper and movable toward and in the same direction as said conveyer to place said confection and said wrapper on said conveyer while the latter is in motion, and means to hold said confection and said wrapper in their proper relative positions on said device during such movement.

63. A machine of the character described comprising confection-forming devices, a carrier movable about a vertical axis and comprising an annular series of pockets arranged to pass below said confection forming devices and receive the confections therefrom, means for imparting movement to said carrier, wrapping devices, a movable support to receive the confections from said carrier and means to actuate said support to cause it to deliver the confection to said wrapping devices.

64. A machine of the character described comprising confection forming devices, a movable carrier having pockets to receive the confections from said forming devices, a continuously moving conveyer, means for placing the confections and their wrappers on said conveyer while the latter is in motion, and twisting devices arranged to act on said wrappers while said conveyer is in motion.

65. A machine of the character described comprising a carrier having a series of pockets to receive confections, a movable wrapper support, means for placing a wrapper on said support, means to convey a confection from said carrier to the wrapper on said support, a conveyer, and means coöperating with said wrapper support to place the confection and the wrapper on said conveyer.

66. A machine of the character described comprising confection-forming devices, a movable carrier having a series of pockets arranged to receive the confections from said forming devices, means to impart an intermittent movement to said carrier, wrapping devices, a chute leading from said carrier to said wrapping devices, and positive means to move the confections through said chute to said wrapping devices.

67. A machine of the character described comprising confection-forming devices, a movable carrier having a series of pockets arranged to receive the confections from said forming devices and having vertical slots in the outer walls thereof, means to impart intermittent movement to said carrier, wrapping devices, a chute arranged to receive the confections from said pockets and leading to said wrapping devices, an ejector adapted to move through said chute and the pocket adjacent thereto and comprising an arm adapted to extend through the slot in said pocket, and means to actuate said ejector.

68. A machine of the character described comprising confection-forming devices, a carrier arranged to receive the confections from said forming devices, a sizer adapted to reduce the confections to a uniform size, wrapping devices, and means for delivering the sized confections from said carrier to said wrapping devices.

69. A machine of the character described comprising confection-forming devices, a horizontally moving carrier comprising a series of pockets arranged to receive the confections from said forming devices, a vertically movable sizer arranged to engage the upper ends of said confections while they are in said pockets and reduce the same to a uniform length, wrapping devices, and means for delivering said confections from said carrier to said wrapping devices.

70. A machine of the character described comprising confection-forming devices, a horizontally movable carrier comprising a series of pockets arranged to receive the confections from said forming devices, a lever pivotally supported on said machine, a plunger carried by said lever and arranged above the path of the pockets of said carrier, means for rocking said lever about its pivotal center to cause said plunger to successively engage the confections in said pockets and compress the same to a uniform size, wrapping devices, and means for delivering the confections from said carrier to said wrapping devices after they have been acted upon by said plunger.

71. A machine of the character described comprising confection-forming devices, a carrier rotatable about a vertical axis and comprising an annular series of pockets open at both their upper and lower ends, said pockets being arranged to receive the confections from said forming devices, an annular plate arranged below and spaced away from the lower ends of said pockets and forming a support for the confections therein, an inclined plate mounted on said annular plate and having its uppermost portion close to the lower end of that pocket which is above the same, a vertically movable plunger arranged above the upper portion of said inclined plate and adapted to engage the upper end of the confection in the pocket above said plate, wrapping devices, and means for delivering the confections from said carrier to said wrapping devices.

72. A machine of the character described comprising confection-forming devices, a carrier arranged to receive said confections from said forming devices, a conveyer, means for delivering said confections from said carrier to said conveyer with the length of the confection parallel with the line of movement of the conveyer, and twisting devices arranged on the opposite sides of said conveyer.

73. A machine of the character described comprising a conveyer, means for delivering a confection and its wrapper to said conveyer with the greatest length of said confection parallel with the line of movement of said conveyer, and twisting devices arranged on the opposite sides of said conveyer.

74. In a machine of the character described, twisting devices, a conveyer to deliver a confection and its wrapper to said twisting devices, a wrapper support arranged near said conveyer, a pair of gripping jaws arranged to engage a wrapper and place the same on said support, means for delivering a confection onto said wrapper when it is in position on said support, and means coöperating with said support to place said confection and its wrapper on said conveyer.

75. In a machine of the character described, twisting devices, a conveyer to deliver a confection and its wrapper to said twisting devices, a wrapper support arranged near said conveyer, a pair of gripping jaws arranged to engage a wrapper and place the same on said support, positive means for actuating said jaws, means for delivering a confection onto said wrapper when it is in position on said support, and means coöperating with said support to place said confection and its wrapper on said conveyer.

76. A machine of the character described comprising a main frame having a flat top, confection-forming devices carried by said main frame, a carrier rotatably mounted on said main frame and arranged to receive the confections from said forming devices, a bracket mounted on the top of said frame and having an inclined guideway, a slide bar mounted in said inclined guideway, a wrapper-support rigidly secured to said slide bar, means for actuating said slide bar, inserter arms mounted on said slide bar and arranged to coöperate with said support, means for delivering the confections from said carrier to said support, two parallel brackets rigidly secured to said main frame, twisting devices carried by said brackets, and a conveyer having one end extending above the top of said main frame in a position to receive the confections and their wrappers from said support and extending between said brackets.

77. In a machine of the character described, a conveyer arranged to move continuously in one direction, a support arranged near the path of said conveyer, means for delivering a confection to said support, and means for moving said support toward and in the direction of movement of said conveyer.

78. In a machine of the character described, a conveyer arranged to move continuously in one direction, a support arranged near the path of said conveyer, means for delivering a confection to said support, an inserter arranged to coöperate with said support, and means for moving said support and said inserter toward and in the direction of movement of said conveyer.

79. In a machine of the character described, a conveyer, a movable support arranged near the path of said conveyer, means for delivering a confection to said support, an inserter arranged to coöperate with said support to place a confection on said conveyer, and a device carried by said inserter to retain said confection on said support.

80. In a machine of the character described, a conveyer, a movable support arranged near the path of said conveyer and adapted to support a wrapper, means for delivering a confection to said support after the wrapper has been placed thereon, an inserter arranged to coöperate with said support to place said wrapper and said confection on said conveyer, and a device carried by said inserter to retain said wrapper on said support.

81. In a machine of the character described, a conveyer, a movable support arranged near the path of said conveyer and adapted to support a wrapper, means for delivering a confection to said support after the wrapper has been placed thereon, an inserter arranged to coöperate with said support to place said wrapper and said confection on said conveyer, and devices carried by said inserter to retain both said confection and said wrapper on said support.

In testimony whereof, we affix our signatures in presence of two witnesses.

DENNIS T. IGOU.
DALE C. IGOU.

Witnesses:
E. O. HAGAN,
F. W. SCHAEFER.